(12) United States Patent
Jalon et al.

(10) Patent No.: US 7,487,458 B2
(45) Date of Patent: Feb. 3, 2009

(54) METHODS AND APPARATUSES FOR CONTROLLING THE APPEARANCE OF A USER INTERFACE

(75) Inventors: Julien Jalon, Paris (FR); Manuel Colom, Paris (FR)

(73) Assignee: Apple Inc., Cupertino, CA (US)

( * ) Notice: Subject to any disclaimer, the term of this patent is extended or adjusted under 35 U.S.C. 154(b) by 832 days.

(21) Appl. No.: 10/665,299

(22) Filed: Sep. 17, 2003

(65) Prior Publication Data

US 2005/0039142 A1 Feb. 17, 2005

(51) Int. Cl.
*G06F 3/048* (2006.01)

(52) U.S. Cl. .................................. 715/765; 715/790

(58) Field of Classification Search ................ 715/747, 715/765, 835, 772, 790, 963
See application file for complete search history.

(56) References Cited

U.S. PATENT DOCUMENTS

| | | | |
|---|---|---|---|
| 4,937,743 A | 6/1990 | Rassman et al. | |
| 5,129,057 A | 7/1992 | Strope et al. | |
| 5,247,438 A | 9/1993 | Subas et al. | |
| 5,323,314 A | 6/1994 | Baber et al. | |
| 5,371,844 A * | 12/1994 | Andrew et al. | 715/747 |
| 5,457,476 A | 10/1995 | Jenson | |
| 5,500,938 A | 3/1996 | Cahill et al. | |
| 5,528,745 A | 6/1996 | King et al. | |
| 5,619,637 A * | 4/1997 | Henshaw et al. | 715/835 |
| 5,621,458 A | 4/1997 | Mann et al. | |
| 5,621,876 A | 4/1997 | Odam et al. | |
| 5,634,100 A | 5/1997 | Capps | |
| 5,659,768 A | 8/1997 | Forbes et al. | |
| 5,664,063 A | 9/1997 | Johnson et al. | |
| 5,761,646 A | 6/1998 | Frid-Nielsen et al. | |
| 5,805,163 A | 9/1998 | Bagnas | |
| 5,838,889 A | 11/1998 | Booker | |
| 5,842,009 A | 11/1998 | Borovoy et al. | |
| 5,855,006 A | 12/1998 | Huemoeller et al. | |
| 5,860,067 A | 1/1999 | Onda et al. | |

(Continued)

FOREIGN PATENT DOCUMENTS

EP 0276427 A2 8/1988

(Continued)

OTHER PUBLICATIONS

VAitA, OsaSync Frequently Asked Questions, Feb. 4, 2004, http://web.archive.org/web/20040204195815/http://www.vaita.com/faq.asp.

(Continued)

*Primary Examiner*—Thanh T Vu
(74) *Attorney, Agent, or Firm*—Blakely, Sokoloff, Taylor & Zafman LLP

(57) ABSTRACT

Methods, systems and machine readable media for displaying (e.g., information from multiple calendars) using different secondary colors generated according to primary colors in a data processing system. In one exemplary method, a calendar interface is displayed on a display device, wherein the calendar interface is capable of displaying calendar events for a user, and a control interface is displayed, which control interface allows the user to selectively display calendar events simultaneously from at least two calendars of the user in the calendar interface. Each of the calendars can have a primary color for display; and, secondary colors are automatically determined based on the primary color for the user interface elements associated with a calendar.

60 Claims, 41 Drawing Sheets

U.S. PATENT DOCUMENTS

| | | | |
|---|---|---|---|
| 5,895,451 A * | 4/1999 | Yamade et al. | 705/8 |
| 5,899,979 A | 5/1999 | Miller et al. | |
| 5,920,313 A * | 7/1999 | Diedrichsen et al. | 715/767 |
| 5,960,406 A | 9/1999 | Rasansky et al. | |
| 6,018,343 A | 1/2000 | Wang et al. | |
| 6,039,355 A | 3/2000 | Durand | |
| 6,064,975 A | 5/2000 | Moon et al. | |
| 6,073,110 A | 6/2000 | Rhodes et al. | |
| 6,085,166 A | 7/2000 | Beckhardt et al. | |
| 6,101,480 A | 8/2000 | Conmy et al. | |
| 6,167,379 A | 12/2000 | Dean et al. | |
| 6,222,549 B1 | 4/2001 | Hoddie | |
| 6,243,325 B1 | 6/2001 | Tomono | |
| 6,272,074 B1 | 8/2001 | Winner | |
| 6,278,456 B1 | 8/2001 | Wang et al. | |
| 6,369,840 B1 | 4/2002 | Barnett et al. | |
| 6,380,959 B1 | 4/2002 | Wang et al. | |
| 6,466,236 B1 | 10/2002 | Pivowar et al. | |
| 6,486,894 B1 * | 11/2002 | Abdelhadi et al. | 715/765 |
| 6,604,079 B1 | 8/2003 | Ruvolo et al. | |
| 6,728,530 B1 | 4/2004 | Heinonen et al. | |
| 6,738,789 B2 | 5/2004 | Multer et al. | |
| 6,760,728 B1 | 7/2004 | Osborn | |
| 6,785,868 B1 | 8/2004 | Raff | |
| 6,868,426 B1 | 3/2005 | Mankoff | |
| 7,007,041 B2 | 2/2006 | Multer et al. | |
| 7,039,596 B1 | 5/2006 | Lu | |
| 7,082,402 B2 | 7/2006 | Conmy et al. | |
| 7,096,232 B2 | 8/2006 | Doss et al. | |
| 7,188,073 B1 | 3/2007 | Tam et al. | |
| 7,296,232 B1 | 11/2007 | Burdick et al. | |
| 7,318,040 B2 | 1/2008 | Doss et al. | |
| 7,334,000 B2 | 2/2008 | Chhatrapati et al. | |
| 7,340,691 B2 | 3/2008 | Bassett et al. | |
| 2001/0014867 A1 | 8/2001 | Conmy | |
| 2001/0044805 A1 | 11/2001 | Multer et al. | |
| 2001/0049617 A1 | 12/2001 | Berenson et al. | |
| 2002/0010807 A1 | 1/2002 | Multer et al. | |
| 2002/0040369 A1 | 4/2002 | Multer et al. | |
| 2002/0131565 A1 | 9/2002 | Scheuring et al. | |
| 2002/0178060 A1 | 11/2002 | Sheehan | |
| 2002/0184321 A1 | 12/2002 | Fishman et al. | |
| 2002/0188607 A1 | 12/2002 | Kogut-O'Connell et al. | |
| 2002/0188620 A1 | 12/2002 | Doss et al. | |
| 2002/0191035 A1 | 12/2002 | Selent | |
| 2002/0196280 A1 | 12/2002 | Bassett et al. | |
| 2003/0045301 A1 | 3/2003 | Wollrab | |
| 2003/0050986 A1 | 3/2003 | Matthews et al. | |
| 2003/0065677 A1 | 4/2003 | Culp et al. | |
| 2003/0065742 A1 | 4/2003 | Culp et al. | |
| 2003/0149606 A1 | 8/2003 | Cragun et al. | |
| 2003/0154116 A1 | 8/2003 | Lofton | |
| 2003/0163537 A1 | 8/2003 | Rohall et al. | |
| 2004/0039779 A1 | 2/2004 | Amstrong et al. | |
| 2004/0073615 A1 | 4/2004 | Darling | |
| 2004/0109025 A1 | 6/2004 | Hullot et al. | |
| 2004/0122915 A1 | 6/2004 | Saare et al. | |
| 2004/0125142 A1 | 7/2004 | Mock et al. | |
| 2004/0215572 A1 | 10/2004 | Uehara et al. | |
| 2005/0125737 A1 | 6/2005 | Allen et al. | |
| 2005/0222971 A1 | 10/2005 | Cary | |
| 2006/0053043 A1 | 3/2006 | Clarke | |

FOREIGN PATENT DOCUMENTS

| | | |
|---|---|---|
| WO | WO 00/62146 A1 | 10/2000 |
| WO | WO 00/62201 A1 | 10/2000 |
| WO | WO 01/49051 A1 | 7/2001 |
| WO | WO 02/44958 A1 | 6/2002 |
| WO | WO 02/089026 A2 | 11/2002 |

OTHER PUBLICATIONS

WindowsITPro, Replying To And Forwarding Messages, Jun. 6, 2003 http://web.archive.org/web/20030625191716/http://www.windowsitlibrary.com/Content/191/1.

Bisignano, Mario et al., "Expeerience: a Jxta middleware for mobile ad-hoc networks", Proceedings of the third International Conference on Peer-to-Peer Computing (P2P'03) 2003 IEEE, 2 pages.

Paluska, Justin Mazzola et al., "Footloose: A Case for Physical Eventual Consistency and Selective Conflict Resolution", Proceedings of the Fifth IEEE Workshop on Mobile Computing Systems & Applications (WMCSA 2003) 2003 IEEE, 10 pages.

Prasad, Sushil K. et al., "Enforcing Interdependencies and Executing Transactions Atomically Over Autonomous Mobile Data Stores Using SyD Link Technology", Proceedings of the 23rd International Conference on Distributed Computing Systems Workshops (ICDCSW'03) 2003 IEEE, 7 pages.

Prasad, Sushil K. et al., "Implementation of a Calendar Application Based on SyD Coordination Links", Proceedings of the International Parallel and Distributed Processing Symposium (IPDPS'03) 2003 IEEE, 8 pages.

PCT Notification of Transmittal of the International Search Report and Written Opinion of the International Searching Authority, or the Declaration, for the PCT Int'l. Appln. No. US2005/014619, mailed Sep. 2, 2005, (11 pages).

PCT International Search Report for PCT International Appln No. US03/28247, mailed Feb. 13, 2004 (6 pages).

PCT Written Opinion for PCT International Appln No. US03/28247, mailed Aug 16, 2004 (5 pages).

PCT International Preliminary Examination Report for PCT International Appln No. US03/28247, mailed Feb. 25, 2005 (6 pages).

PCT International Search Report for PCT International Appln No. US03/28053, mailed Jun. 18, 2004 (5 pages).

PCT Written Opinion for PCT International Appln No. US03/28053, mailed Sep. 16, 2004 (5 pages).

PCT International Preliminary Examination Report for PCT International Appln No. US03/28053, mailed Mar. 3, 2005 (6 pages).

Beard, et al. "A Visual Calendar for Scheduling Group Meetings," Proceeding of the 1990 ACM Conference on Computer-Supported Cooperative Work, Oct. 1990, pp. 279-290.

Timecruiser Computer Corporation, "Timecruiser User Guide," version 1.5, Jul. 1998, downloaded on Aug. 3, 2005 at https://www.atd.net/timecruiser/doc, pp. 1-50.

F. Dawson and D. Stenerson: "Internet Calendaring and Scheduling Core Object Specification (iCalendar)", Network Working Group, Request for Comments: 2445, Nov. 1998.

B. Mahoney, G. Babics, A. Taler: "Guide to Internet Calendaring", Network Working Group, Request for Comments: 3283, Jun. 2002.

Supplementary European Search Report for EP Application No. 03794665.4, dated Aug. 30, 2006 (3 pages).

PCT International Preliminary Examination Report for PCT International Appln. No. US2005/014619, mailed Dec. 7, 2006 (7 pages).

* cited by examiner

FIG. 5

METHODS AND APPARATUSES FOR CONTROLLING THE APPEARANCE OF A USER INTERFACE

The present invention in one embodiment relates to controlling the appearance of a user interface with colors, such as a computer program comprising a plurality of calendars.

In the last fifty years, the pace of life and complexity for the consumer has increased considerably. Hitherto, many consumers merely required a simple manuscript diary or calendar to organise the various commitments and events occurring in their life. This developed further for consumers in having more than one diary or calendar for each person of a household or for different areas of their life. Thus, it was not uncommon to maintain a family diary for the events for each member of the household and work calendars to maintain events for working members of the household and possibly also social calendars to maintain events for social matters such as theatre appearances or sporting fixtures.

As the pace of life and complexity for the consumer increased even further, maintaining those separate calendars became considerably more difficult. It was not uncommon for the appropriate calendar not to be available or conflicting events from different calendars confirmed.

Thus, it has been proposed to have a single system for maintaining events. Having a single manuscript calendar becomes very bulky and difficult to access from various sites and difficult to present data in a cohesive manner. Accordingly, electronic calendar programs have been developed. Events for different categories are indicated by different labels or other distinguishing marks. However, having a single electronic calendar is still very cumbersome to use and when there are many events for a single time span, the calendar can become very confusing.

In due course, electronic calendars provided the user with a plurality of calendars, each one dedicated to a category such as home, work, school, football fixtures, golf fixtures, theatre productions etc. An example of which can be found in one of the personal digital assistants provided by PSION (Registered Trade Mark). A user of such electronic calendars is required to enter and view events for the relevant category in the relevant calendar. When checking potentially conflicting events, a user must scroll through each of the calendars in turn. Managing the calendars and various events stored in the calendars is not easy and requires considerable organisational skills.

SUMMARY OF THE DESCRIPTION

Certain embodiments of the present invention are directed towards an improved system for managing a plurality of calendars with different colors in a more cohesive manner. Some of the embodiments of the present invention are summarized in this section.

In one embodiment of the present invention, a method to display user interface elements on a data processing system includes: automatically determining, based on a primary color, a plurality of secondary colors for the user interface elements; and, displaying the user interface elements using the plurality of secondary colors. In one example, the primary color and the plurality of secondary colors have substantially the same Hue. In one example, a plurality of colors are first displayed on a display device of the data processing system; and, user input is then received to select one of the plurality of colors as the primary color. In one example, the plurality of secondary colors are selected from a plurality of pre-designed colors according to the primary color. In another example, color components of the plurality of secondary colors are computed according to color components of the primary color. In one example, color components of one of the plurality of secondary colors are computed based on color components of the primary color and color components of a plurality of pre-designed secondary colors, which are associated respectively with a plurality of pre-designed primary colors. In one example, the color components of the one of the plurality of secondary colors are discontinuous functions of the color components of the primary color. In another example, the color components of the one of the plurality of secondary colors are continuous functions of the color components of the primary color; and, one from a plurality of candidates is selected to color a user interface element, where the plurality of candidates include the one of the plurality of secondary colors. In one example, it is first determined which one of a plurality of regions in a color space is the primary color in; and, the plurality of secondary colors is then determined based on a result of determining which one of the plurality of regions in the color space is the primary color in. In one example, an icon image for the user interface elements is further generated using at least one of the plurality of secondary colors. In one example, a plurality of icon images are first created according to a plurality of image models, where each of the plurality of image model are associated with one of a plurality of regions a color space; and the plurality of icon images are then mixed according to a position of the primary color in relation with the plurality of regions in the color space to generate the icon image for the user interface elements. In one example, the plurality of regions comprises a dark color region and a bright color region; and, the plurality of icon images are mixed according to a measurement of distance to a boundary that separates the dark color region and the bright color region in the color space. In one example, the method includes selecting one from candidates including at least one of the plurality of secondary colors to apply to one of the user interface elements. In one example, the method further includes displaying information from a plurality of calendars in a calendar interface, where the primary color is associated with one of the plurality of calendars and the user interface elements displayed using the plurality of secondary colors are associated with the one of the plurality of calendars. In one example, an arbitrary color is selected as the primary color for the one of the plurality of calendars.

In one exemplary embodiment, a method of controlling a graphical user interface of a data processing system involves: (a) presenting a range of colors which appear to vary in a substantially continuous manner; (b) receiving a user input selecting a color from said range of colors; (c) automatically determining, based on the color, a plurality of colors for a corresponding plurality of user interface elements; and (d) displaying the plurality of user interface elements in the plurality of colors. The process of automatically determining the plurality of colors may involve a predetermined mathematical process, executed by the data processing system, which selects the plurality colors without user intervention (after the user selects a "primary" color). The range of colors may be presented as a substantially continuous color spectrum (e.g., a color wheel). The user interface element may be scheduled events in multiple (e.g., home and work) calendars, and at least one of the user interface elements may be a graphical user interface (GUI) control (e.g., a button) which, upon activation by a user, cause the data processing system to perform an action. This method of controlling a GUI may be used for only one program (e.g., a calendar program) which executes on the data processing system, or for a set of programs (but not all programs) which are executable on the data processing system, or for all programs which are executable on the data processing system.

One exemplary embodiment of the present invention is related to a computer program comprising a plurality of calendars and a user interface wherein the improvement lies in that the user interface provides an interface for two or more calendars. That is to say each calendar simultaneously shares the user interface. Thus, there are a number of calendars per user in comparison to the prior art which focuses on a single calendar per user whereby events are distinguished between each other, or a number of calendars each dedicated to a particular category and each using separate user interfaces. Exemplary methods of the invention and exemplary systems embodying the invention are also described.

The present invention includes methods and apparatuses which perform these methods, including data processing systems which perform these methods, and computer readable media which when executed on data processing systems cause the systems to perform these methods.

Other features of the present invention will be apparent from the accompanying drawings and from the detailed description which follows.

BRIEF DESCRIPTION OF THE DRAWINGS

Embodiments of the present invention will now be described by way of further example only and with reference to the accompanying drawings, in which:

FIG. 5 is a diagram of a user interface according to the preferring embodiment illustrating to do items;

DETAILED DESCRIPTION

Embodiments of the present invention relate to calendar operations on a data processing system. A data processing system which may be used with embodiments of the invention typically include a display for displaying a calendar interface and a processor for controlling the display and an input device. Examples of such data processing systems include general purpose computers or special purpose computers or personal digital assistants or cellular telephones. Examples of data processing systems are shown and described in U.S. Pat. No. 6,222,549 which is hereby incorporated herein by reference. Often, the data processing system will include a memory for storing software (e.g. computer program) instructions. Embodiments of the invention may be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device (addressable through a network). In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor of a data processing system.

A machine readable media can be used to store software and data which when executed by a data processing system causes the system to perform various methods of the present invention. This executable software and data may be stored in various places including for example ROM, volatile RAM, non-volatile memory and/or cache. Portions of this software and/or data may be stored in any one of these storage devices.

Thus, a machine readable media includes any mechanism that provides (i.e., stores and/or transmits) information in a form accessible by a machine (e.g. a computer, network device, personal digital assistant, manufacturing tool, any device with a set of one or more processors, etc.). For example, a machine readable media includes recordable/non-recordable media (e.g. read only memory (ROM); random access memory (RAM); magnetic disk storage media; optical storage media; flash memory devices; etc.) as well as electrical, optical, acoustical or other forms of propagated signals (e.g. carrier waves, infrared signals, digital signals, etc.); etc.

Figure 1:
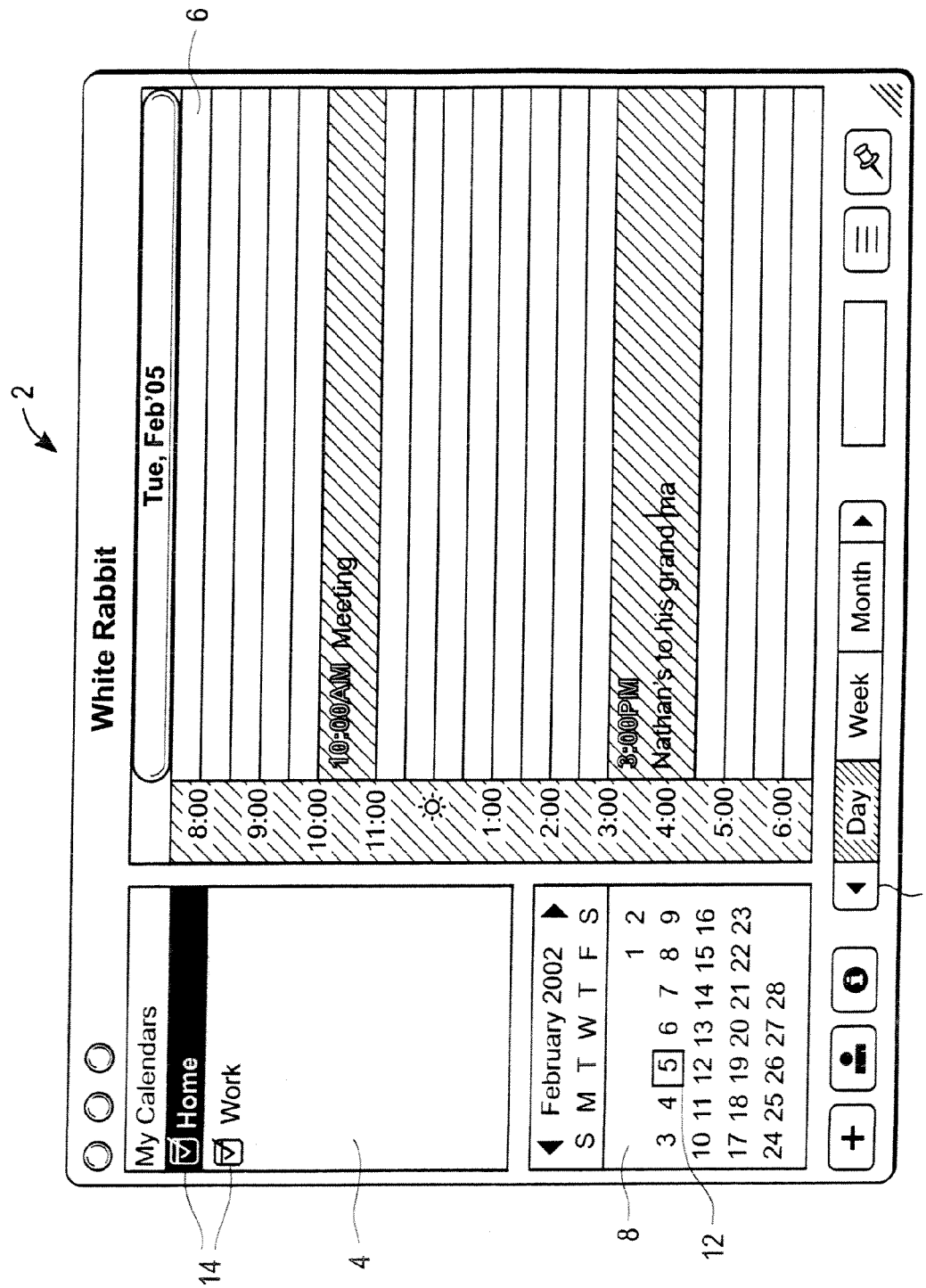
FIG. 1 is a diagram of a user interface according to an embodiment of the present invention.

The present invention in one exemplary embodiment comprises a computer program having a user interface providing an interface for two or more calendars. FIG. 1 is a diagram of such a user interface 2. The user interface includes a number of windows 4, 6 and 8. Window 4 is titled "My Calendars". FIG. 1 illustrates the use of the user interface with two calendars, namely "Home" and "Work". The names of the calendars are displayed in the "My Calendars" window. Preferably, the calendars "Home" and "Work" are created by default. Other calendars may be included, especially public event calendars.

Figure 2:
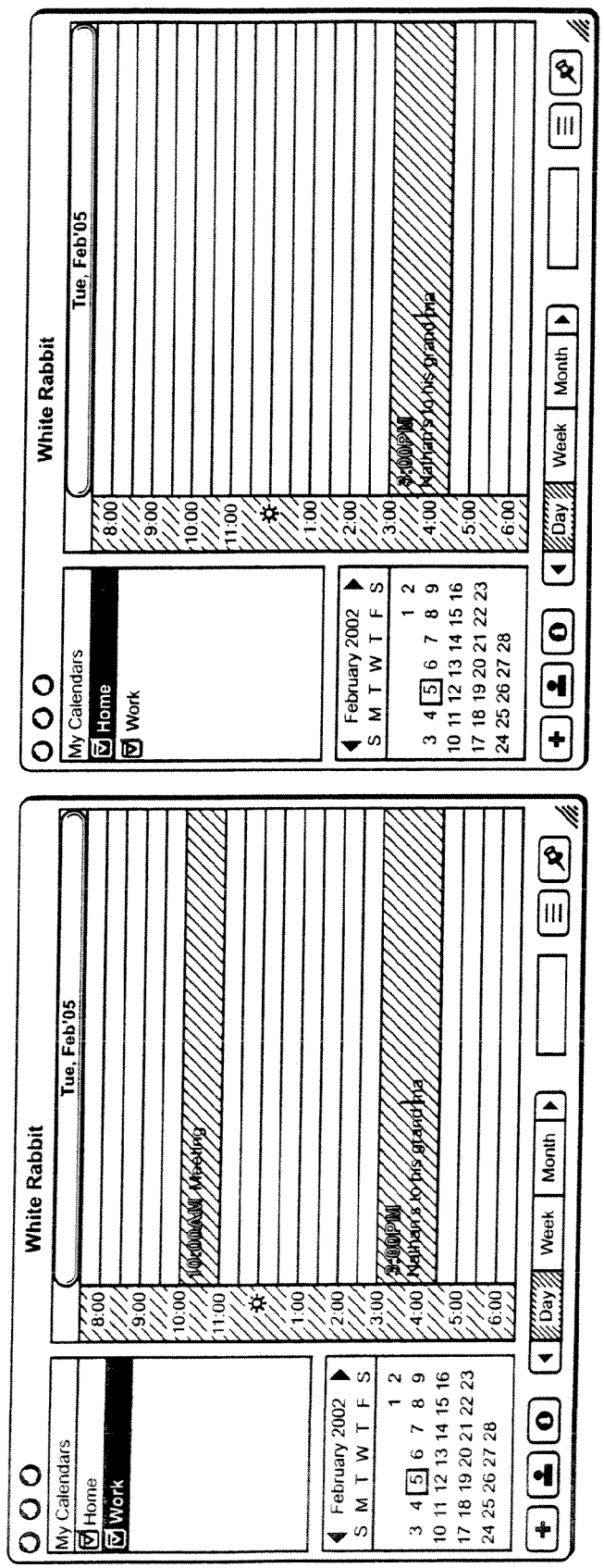
FIG. 2 is a diagram of the user interface according to an embodiment of the present invention illustrating two situations, one displaying events from two calendars and the other displaying events from only one calendar.
Figure 3:
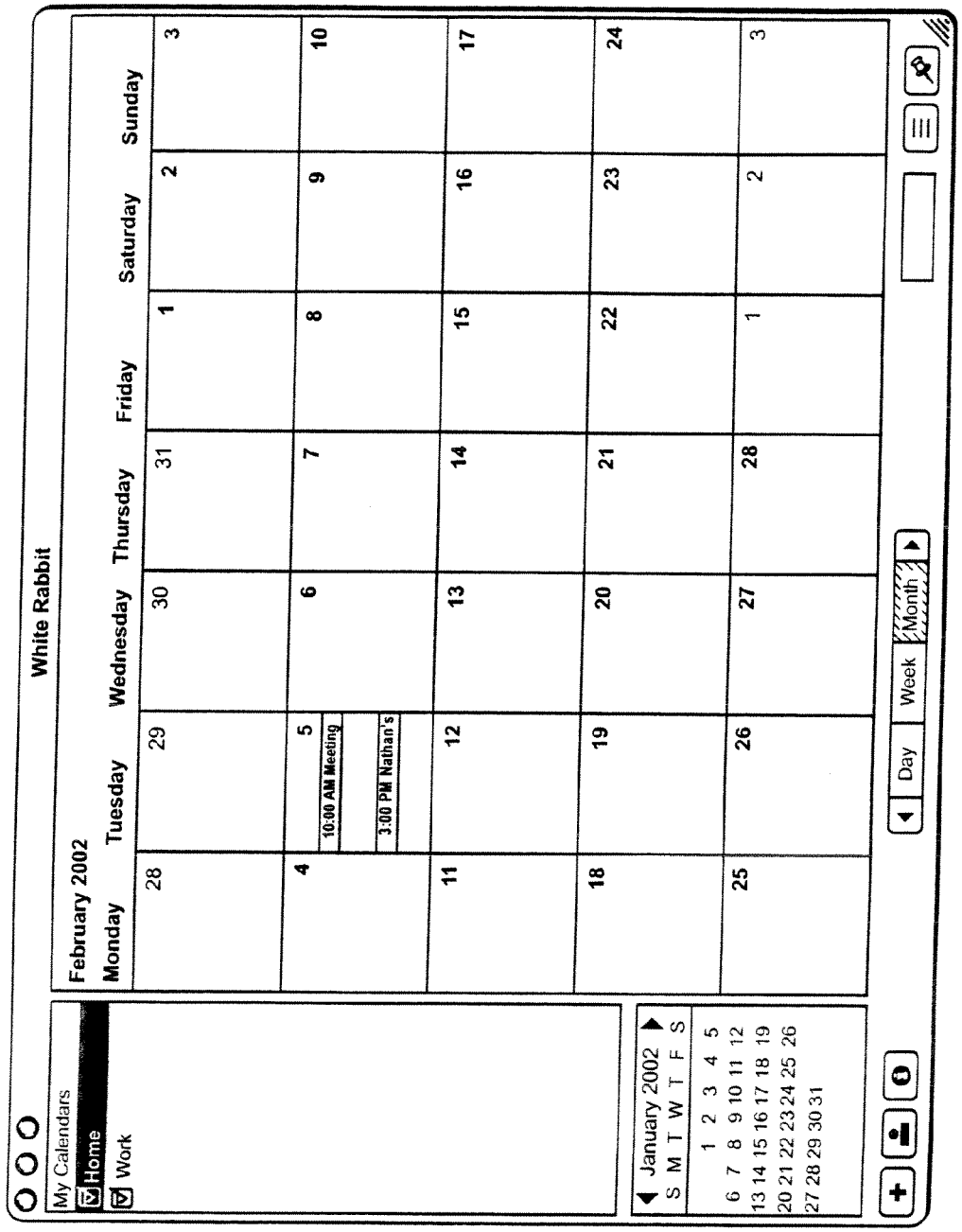
FIG. 3 is a diagram of a user interface according to the present invention illustrating a different data range as the primary date range.

Window 6 comprises a primary date range. In FIGS. 1 and 2, the primary date range comprises a day with a data field for each hour. In FIG. 3, the primary date range is a month. Needless to say, the primary date range may be weekly or yearly. A selector 10 in the user interface enables a user to select which primary date range to display.

The primary date range includes a data field for each unit of the primary date range. That is to say, in the daily date range, the data fields are hours, in the weekly date range, the data fields are days or hours, in the monthly date range, the data fields are days or hours and in the yearly date range, the data fields are months, weeks, days or hours. As shown in FIG. 3, the data fields may display sub-fields for each hour of the day when the primary date range is monthly. Similarly, in the yearly date range, each data field may display sub-fields for each day. In the daily date range, the preferred embodiment displays only some of the hours available.

Window 8 enables a subsidiary date range to be displayed. In FIGS. 1 and 2, the subsidiary date range is monthly. A marker 12, enables the day selected in the primary date range to be indicated in the subsidiary date range. For example, Tuesday Feb. 5, 2002 is shown in the primary date range and this day is indicated by the marker in the subsidiary date range which displays February 2002.

The user interface provides a toggle or control interface 14 for each calendar. The user interface indicates to the user that the toggle is activated when a tick or check mark appears next to the name of the calendar. If a toggle is activated, then the events from the respective calendar are displayed by the user interface, typically by displaying the events in a calendar interface such as a daily or weekly or monthly view. FIG. 2, illustrates two situations for the user interface. One situation has the user interface displaying events from two calendars, namely "Home" and "Work" whereas the other situation has the user interface displaying events from only one calendar, namely "Home". For example, in the first situation in FIG. 2, there is an event occurring at 10 am, namely "Meeting" which is not displayed in the other situation since this event only appears in the calendar "Work" which is not activated.

The present invention thus enables a user to manage all of the required calendars using a computer program having a single user interface and all of the 2 or more calendars may be calendars for the same user displaying events, meetings, etc. for that user. The user interface significantly enhances the management of the events occurring over a plurality of calendars. Thus, when checking availability of a new event, a user merely needs to activate all of the relevant calendars (leaving the other calendars not activated), and the events in all the relevant (activated) calendars are all displayed and a user can easily confirm whether there is availability. Conversely, when considering just one category of events, a user merely needs to deactivate the redundant calendars and activate only the one relating to the particular category. The user interface thus very efficiently manages the calendars on the one hand by combining all of the calendars and yet allows flexibility to focus on one or a few calendars to minimise confusion and reduce complexity.

FIGS. 4 to 7 illustrate a preferred embodiment of the present invention. In FIGS. 4 to 7, window 8 displays more than one month as the subsidiary date range. Moreover, the marker 12, indicates a selected week. Window 6 comprises the primary date range of a week with hourly data fields for each day of the week. The user interface indicates a particular day in the primary date range and a detailed marker 16 in the subsidiary date range indicates the same day. For example, Tuesday 27th Aug. 2002 is highlighted in the primary date range and the detailed marker indicates the same day and this is distinguished from the marker 12 in the subsidiary date range.

Figure 4:
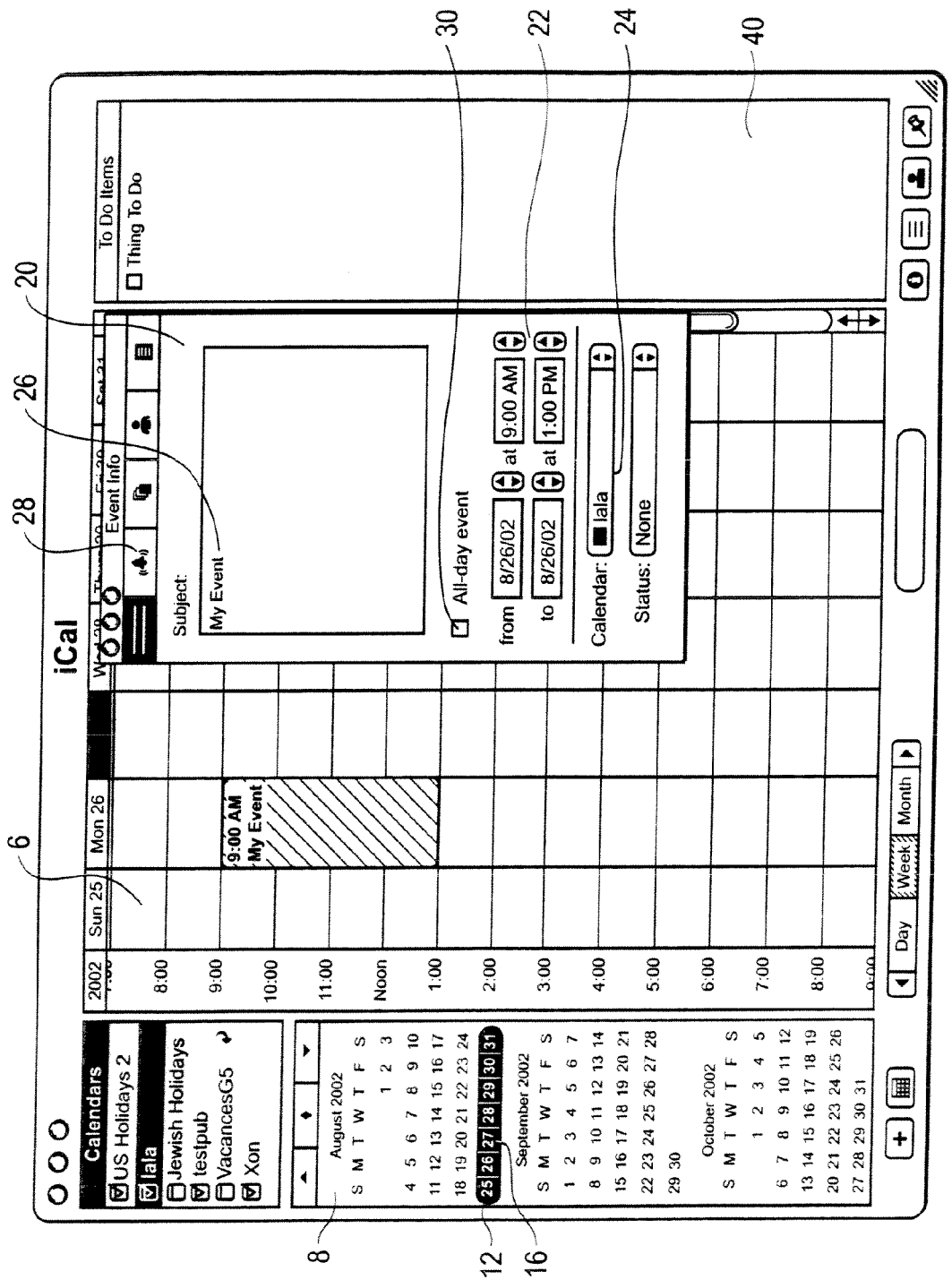
FIG. 4 is a diagram of a user interface according to the preferred embodiment illustrating the display of events.

FIG. 4 illustrates an event, namely "My Event". The event is displayed as a 2-D shape, namely a rounded rectangle. The 2-D shape has boundaries which are approximately contiguous with the specified duration, namely 9 am to 1 p.m. and thus represent the duration of the event.

In order to minimise confusion, only one of the calendars is selected for editing at any one time. Thus, a user selects a calendar of most importance in the hierarchy of all of the calendars. This is indicated by highlighting in the user interface. For example, as shown in FIG. 4, the calendar "lala" is highlighted, thereby indicating that as the most important calendar.

When a user wishes to add, select, modify or delete an event, the user may highlight the event and double click. An interrogator interface 20 is activated and displayed. The date of the event and duration are displayed as shown at 22. Changes can be made using the arrows. The calendar from which the event is taken is also displayed at 24. The event may be moved from one calendar to another by changing the associated calendar appearing at 24. The details of the event are displayed at 26. Not only may the event be changed but also properties associated with the event may be changed. For example, an alarm may be indicated and/or selected at 28. When the alarm is due, any known computer program alarm may be provided such as an audio or visual announcement. A shortcut 30 may be activated to set the duration as the whole day or other duration depending upon the primary date range used. Another property is to set the event as recurring. A recurring event may comprise for example Birthdays, anniversaries, regular appointments etc.

The user interface of the preferred embodiment shown in FIG. 4 also includes an additional window 40. Window 40 is entitled "To Do items". To do items include those tasks for which a specific time is not required but set for a particular day, week, month or year, depending upon the primary date range selected. In FIG. 4, the primary date range is weekly and the to do items are noted for a particular day. To do items can be displayed such as that shown in FIG. 5. The to do items may be implemented in a "Franklin Covey mode".

Figure 6:
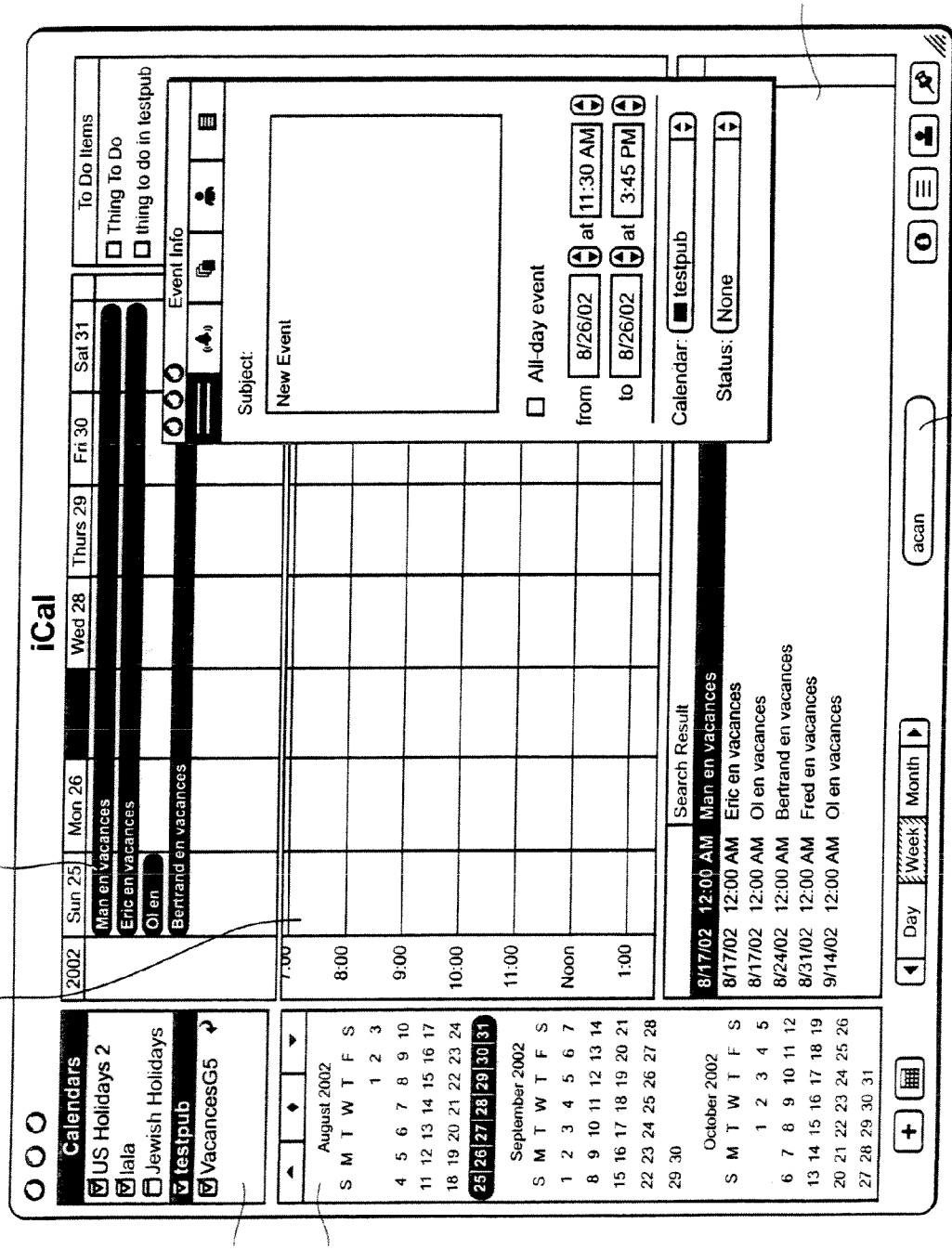
FIG. 6 is a diagram of a user interface according to the preferred embodiment illustrating a search result window.

FIG. 6 illustrates a user interface with an additional window 50. Window 50 provides another subsidiary date range, in this case weekly. The events occurring in window 50 are generally of a day long duration. Such a display is particularly useful when displaying user's holidays or national holidays or other events of a day duration such as Birthdays. Those events are indicated by a 2-D rectangular shape with rounded corners at the extremities of the duration. Such events are termed banners. A banner may also be used to display a weekend or holiday period. The computer program is able to display such a banner with rectangular corners at the extremity of the duration when the shortcut 30 is activated.

The preferred embodiment also provides for searches to be effected. The searches are facilitated by search interface 60. A string of characters is entered into the search interface. A search is conducted across selected calendars and the search results are displayed in a search result window 62. For example in FIG. 6, the search string "acan" was entered and various entries identified and displayed. The search interface also enables each of the events presented thereby to be viewed and/or changed and selecting one of the results in the search interface for changing may produce the interrogator interface as discussed above.

Figure 7:
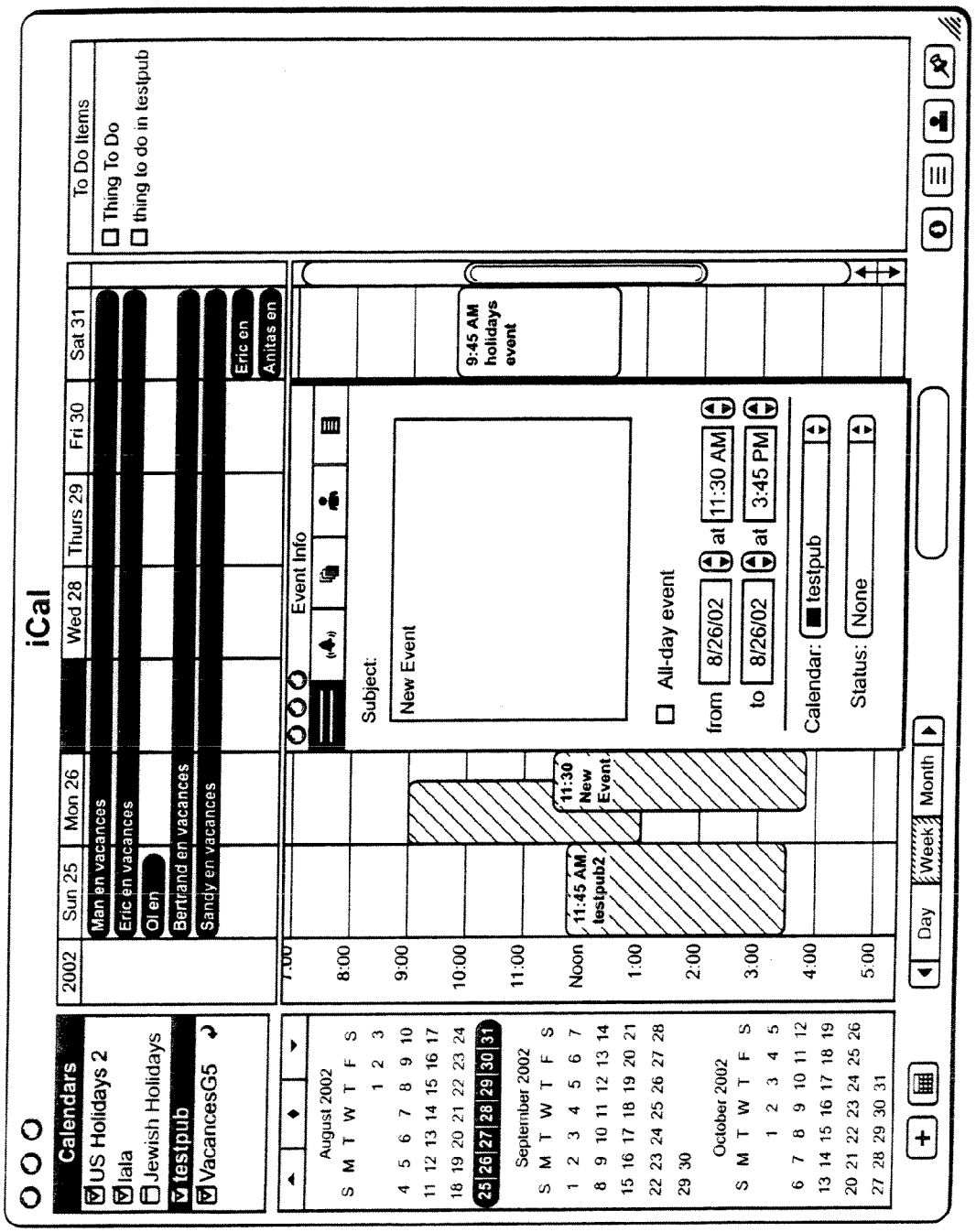
FIG. 7 is a diagram of a user interface according to the preferred embodiment illustrating overlapping events.

As discussed above, events from each toggled calendar are displayed by the user interface. FIG. 7 illustrates the user interface according to the preferred embodiment whereby several calendars are toggled, namely "US Holidays 2", "lala", "Jewish Holidays", "testpub" and "VacancesG5". The events from all of these toggled calendars are shown in the primary date range. It is not uncommon for events to conflict. Thus, a distinguishing feature is provided to distinguish between conflicting events. The distinguishing feature may comprise a different color, the shape of the event being displayed differently and/or one of the events being translucently displayed. When color is used, the name of the calendar and each of the events or their shape take the same color.

Figure 8:
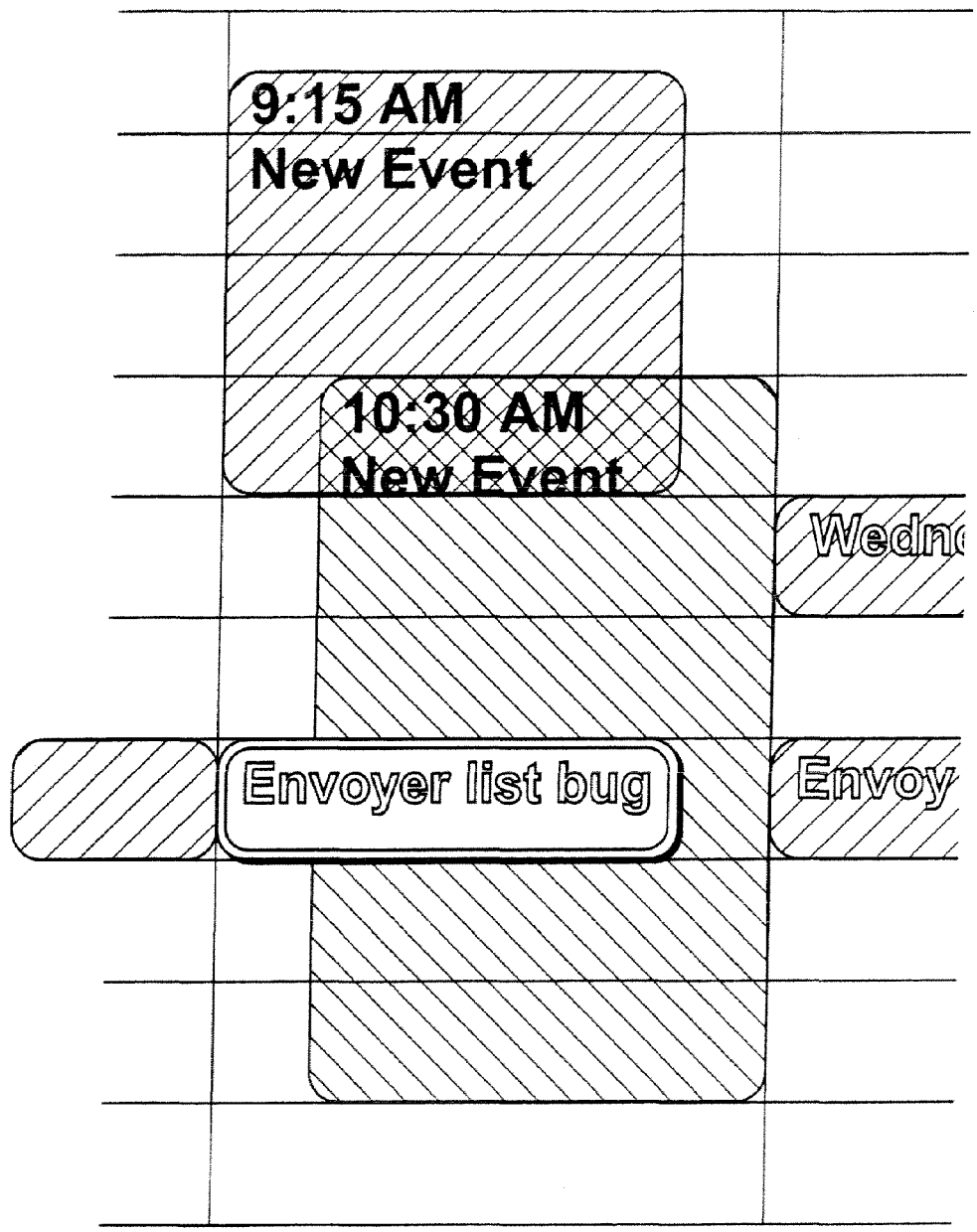
FIG. 8 is a diagram of part of a user interface according to the preferred embodiment illustrating said overlapping events in more detail.

In FIG. 7, there are two conflicting events which overlap between 11.30 am and 1 p.m. The events are displayed in a translucent manner and with their shape reduced such that the lateral boundary does not extend the full width of the day data field. FIG. 8 illustrates this in more detail. In this case, there are two conflicting events with the event entitled "New event" at 10.30 am. The other events "New event" at 9.15 am and "envoyer list bug" are reduced in size and aligned with the left perimeter of the day data field whereas the event "New event" at 10.30 am is reduced in size and aligned with the right perimeter of the day data field. Moreover, event "New event" at 1030 am is made translucent so that event "New event" at 9.15 am can be seen there through and event "envoyer list bug" is overlaid.

Two features of embodiments of the present invention are the instant access to data and the natural selection and visualisation of other sources of events. The present invention may contain a large multitude of events, in particular because of its ability to include many calendars within a calendar interface for a user. Thus, it becomes critical for a user to quickly and easily find relevant data in a given context. For example, during work hours, a user must be able to easily find meetings concerning a given project, by selecting only the work calendar and searching for the given project. However, at home, the same user, with the same computer program and user interface must have a way to easily find social details such as the soccer matches for any given team, again through selecting only the relevant calendars and searching for the given team. The user is thus provided with a live textual search system and related navigational facilities.

Embodiments of the present invention thus achieve the objectives of enabling a user to manage all of the required calendars using a computer program having a single user interface. The user interface significantly enhances the management of the events occurring over a plurality of calendars. Thus, when checking availability of a new event, a user merely needs to activate (e.g. "toggle") all of the relevant calendars, whose events are all displayed and a user can easily confirm whether there is availability. Conversely, when considering just one category of events, a user merely needs to deactivate (e.g. "de-toggle") the redundant calendars and activate only the one relating to the particular category. The user interface thus very efficiently manages the calendars on the one hand by combining all of the calendars and yet allows flexibility to focus on one or a few calendars to minimise confusion and reduce complexity.

Preferably the computer program is operative on a data processing system such as a computer such as one of the Macintosh personal computers from the applicant, Apple Computer Inc. of Cupertino, Calif., USA. More preferably the computer program is operative in the MacOS x version 10.2, known as Jaguar (Registered Trade Mark). Moreover, the computer program is complementary to Mail and Address Book computer applications also available from Apple for full personal information management. Needless to say, the computer program is compatible with printing applications and functions. Embodiments of the present invention may also be used on other types of data processing systems such as a personal digital assistant (PDA) (e.g. a Palm PDA or a Pocket PC) or a cell phone with a calendar system or a music player, such as an iPod from Apple.

In addition, the computer program is compliant with standards for calendaring applications such as iCal and vCal (both Registered Trade Marks) and allows import of data from other applications like Entourage (Registered Trade Mark) available from Microsoft. Further details can be obtained from http://www.imc.org/draft-ietf-calsch-inetcal-guide. The computer program is also compatible with the iTools web service available from Apple in order to share calendar data easily over the Internet.

In view of the compatibility discussed above and in particular with the operating system, the computer program enables copy and paste with other applications, drag and drop facilities, use of the spellchecker, integration with email applications and integration with address applications for management of personal information.

Figure 9:
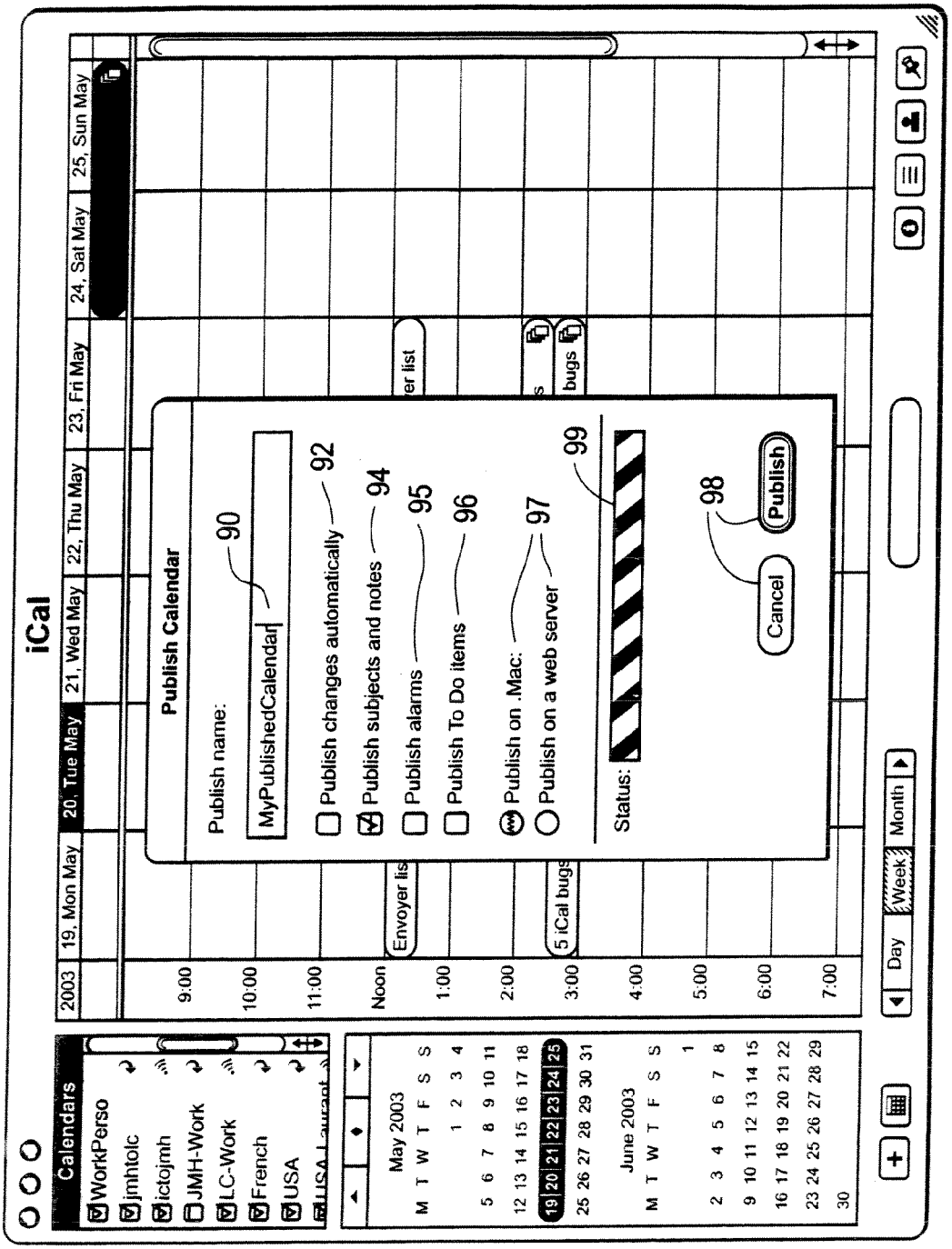
FIG. 9 is a diagram of a publish interface for publishing one of the calendars.

Moreover, the preferred embodiment also provides a publish and subscribe user interface for providing one or more calendars to others and/or for subscriber to other calendars. FIG. 9 illustrates a publish interface for facilitating the publication of the selected calendar. In the publish interface, one of the calendars is selected at 90. A user may set preferences associated with the selected published calendar. For example, all changes effected on the calendar are published automatically at 92. All notes and events are included at 94. Any alarms set can also be included or not in the published calendar at 95 since these may not be relevant to a subscriber. Similarly any to do items can be included or not in the published calendar at 96. Finally, the publish interface enables the calendar to be published either over the Internet or on a server at 97. Confirmation or cancellation can be effected via buttons 98. Finally, a status of the publication is indicated at 99.

Figure 10:
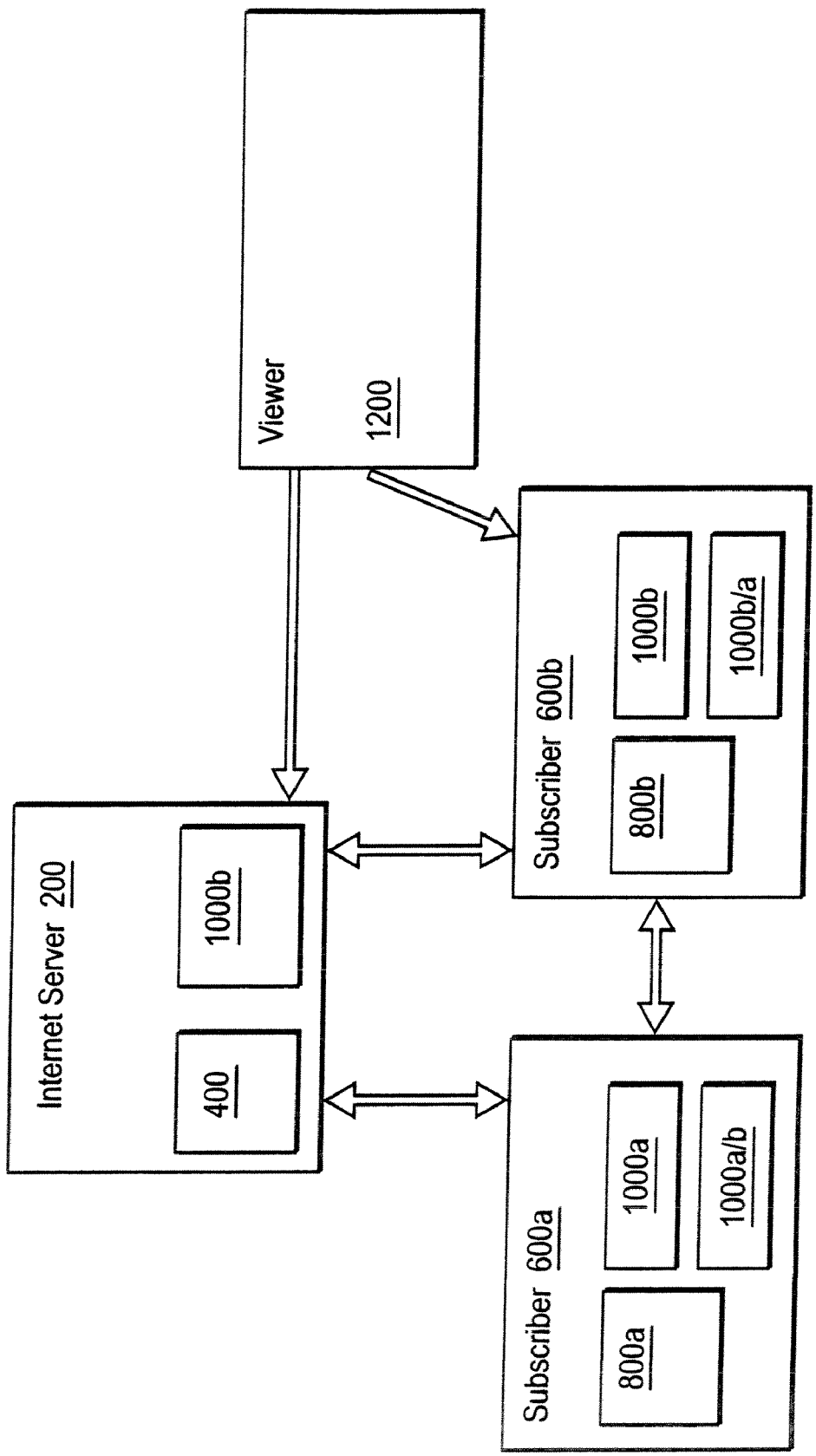
FIG. 10 is a schematic illustration of publishing a calendar according to the present invention.

Details of a method of managing a calendar by publishing and subscribing is described in one of our other copending applications, application Ser. No. 453,193, filed on Jun. 2, 2003 and entitled "A Method Of Managing A Calendar And A Computer System For Implementing That Method." Although this other application is incorporated herein by reference in full, relevant details of which are as follows:

FIG. 10 illustrates schematically a computer server 200 on which is stored a calendar 400 containing at least one event. A number of subscriber electronic devices 600a, 600b etc are each connected to the server 200. In the preferred embodiment, the computer server is provided over the Internet and the subscribers are computers connected intermittently to the server. Alternatively, the server could comprise a local area network to which the subscribers are connected permanently. The electronic devices could comprise any form of electronic device such as a notebook or laptop computer, personal digital assistant, mobile telephone, palm device etc.

The server 200 has stored thereon the calendar of events 400. The calendar 400 is downloaded and stored on each of the subscribers to form a local calendar 800a, 800b etc. The local calendar is stored in the same electronic format as on the server. The preferred embodiment enables the local calendar to be stored with a subscriber calendar 1000a, 1000b etc. In particular, the local calendar and the subscriber calendar both share the same user interface as described herein.

The present invention may also include a viewer electronic device 1200. A viewer 1200 may access the calendar stored on the server but may not download the same to form a local calendar. In order for a viewer to become a subscriber, the viewer must pay a subscriber fee.

A viewer electronic device may comprise any of the same subscriber electronic devices, for example a notebook or laptop computer, personal digital assistant, mobile telephone, palm device etc and be connected in any of the arrangements as for a subscriber. Depending upon the electronic device involved any suitable electronic connection may be made as is well known in the art including USB, serial ports, firewire, bluetooth, infrared and over the Internet.

The preferred embodiment also enables a subscriber 600*b* to publish their local calendar 1000*b* to the server 200 or for viewing by a viewer 1200. Another subscriber, such as 600*a* may download the published local calendar 1000*b* to form a local subscriber calendar 1000*a/b*. The viewer may view the local calendar stored on the server 1000*b* or directly if connected to the subscriber.

The subscribers may also be connected directly. In this case, a subscriber 6*a* may publish the local calendar 1000*a* to the other subscriber 600*b* which is then stored to form a local subscriber calendar 1000*b/a* stored on subscriber 600*b*.

The present invention provides for any number of calendars to be provided by the server or any number of electronic devices either subscriber or viewer to be included.

Figure 11:
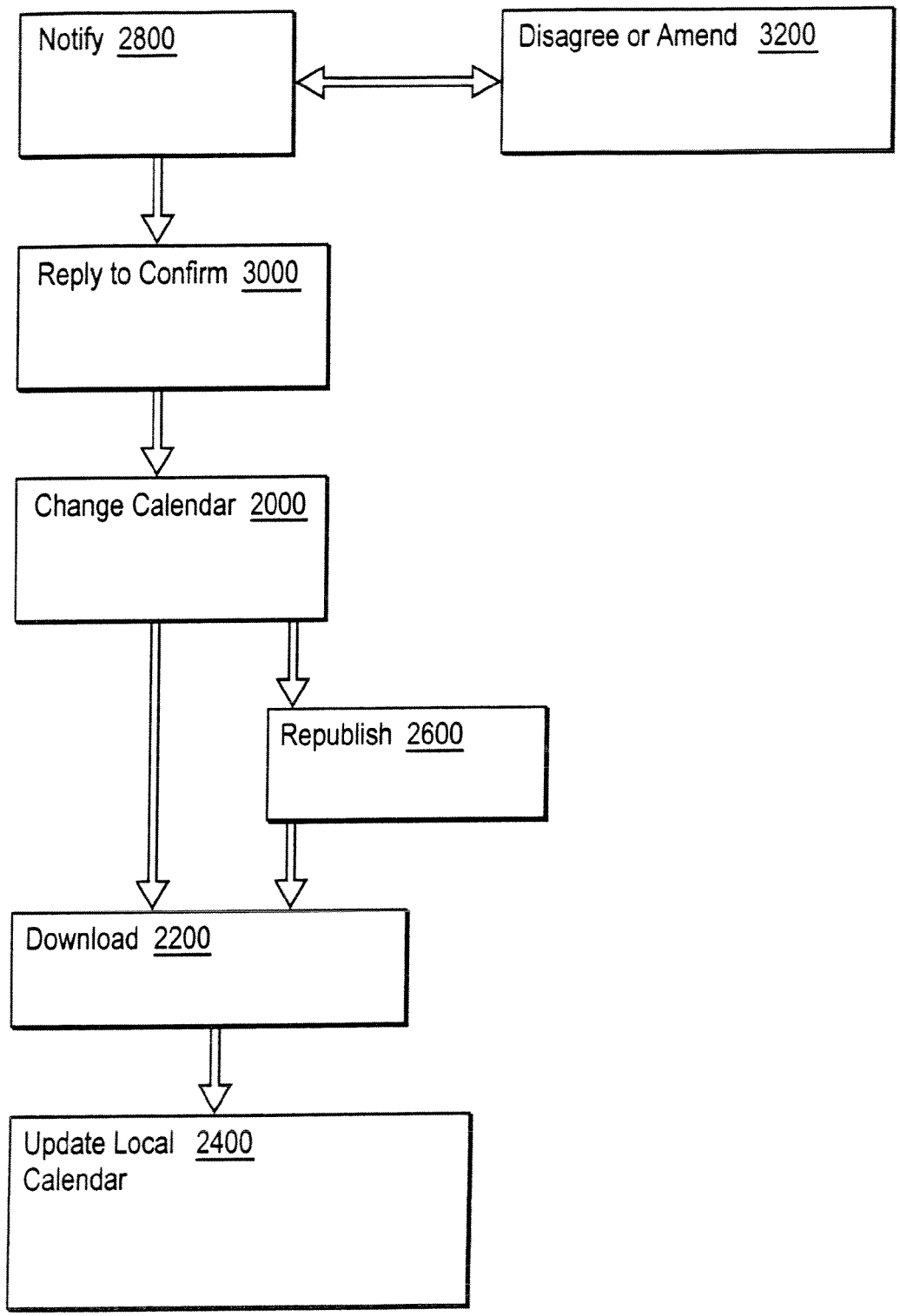
FIG. 11 is a schematic diagram of a flow chart for changing an event in a calendar which is published according to the present invention.

Many calendars are not static. Static calendars include those relating to national holidays, birthdays, daylight saving transition dates, tide data etc. However, many calendars are not static and events need to be added, modified or deleted. All of these are termed as changes. FIG. 11 illustrates schematically changes to be effected on a calendar which is published.

In the first instance a change may be made to a calendar in operation 2000. If the change occurs on a calendar 400 stored on the server 200, then each subscriber 600*a*, 600*b*, downloads the change in operation 2200 and the local calendar 800*a*, 800*b* is updated in operation 2400. If the change occurs on a local calendar 1000*a* stored on a subscriber, then the calendar, if sent directly to another subscriber 600*b*, is downloaded by the subscriber 600*b* and the local subscriber calendar 1000*b/a* is updated. If the local calendar 1000*b* is published on the server 200, then the local calendar 1000*b* is republished in operation 2600. The other subscriber 1000*a*, downloads the republished calendar 1000*b* and updates the local subscriber calendar 1000*a/b* stored thereon.

The preferred embodiment also provides for a dialog between users operating the subscriber devices in order to confirm, disagree or amend any changes. A user of one of the subscribers may send a notification to the other subscriber in operation 2800. The recipient subscriber may reply to confirm the change in operation 3000. The change is then effected on the calendar and the change implemented on the local calendar as discussed above. The recipient subscriber may reply to disagree or amend the proposed change in operation 3200. The subscriber and recipient may conduct this dialog between notifying 2800 and replying 3200 until a reply to confirm 3000 is received. The change is then effected as discussed above.

The server or subscriber generating the calendar 400, 1000*a* or 1000*b* may provide for the recipient subscriber to view the calendar only or effect changes. Other preferences may be determined by the server or subscriber. Such preferences include the time period between making changes to the calendar and downloading those changes. Other preferences include merely notifying a user of a subscriber of a change. All such preferences are facilitated through the use of a user interface such as described above and shown in FIG. 9.

The present invention thus enables events from more than one calendar to be disseminated and organised in a method which is more manageable. In particular, events do not need to be re-entered onto the users electronic calendar thereby avoiding errors and the user can selectively choose events from certain calendars to be included in their local calendar. Moreover, the method provides for changes being effected and a dialog between at least two users for confirming on changes to be made.

Thus, through publishing and subscribing to other users calendars and public calendars, the need for facilitating the management of all of that data is achieved through the use of a single user interface.

Figure 5:
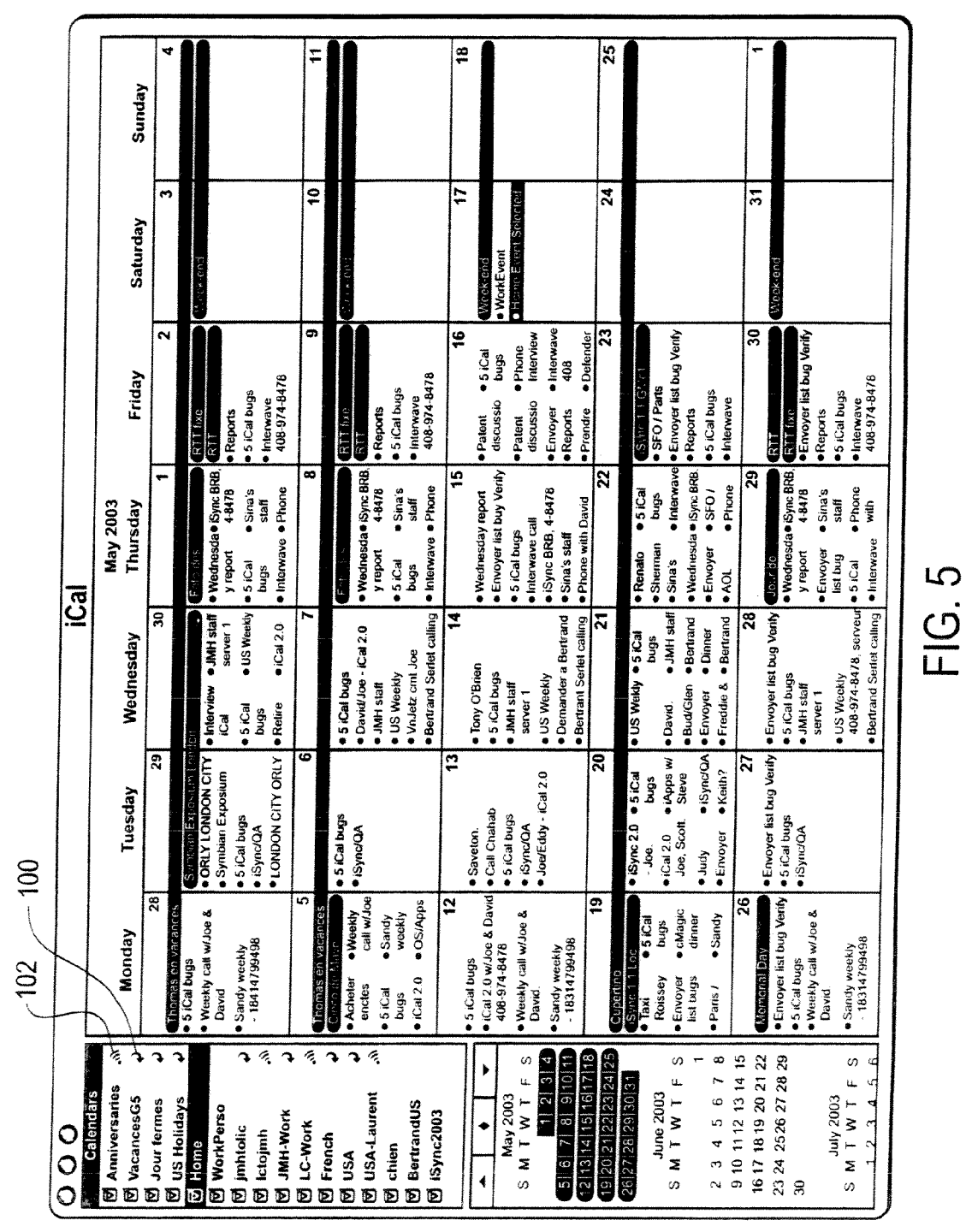

To assist a user in appreciating which calendars are specific to the user or those which are subscribed, a tag 100 as shown in FIG. 5 is used. Those calendars which include alarms associated with an event include a tag 102.

To enhance the security of data integrity and reduce complexity, it is preferred that data involved in the computer program is always synchronised across various electronic devices. A method of synchronising three or more electronic devices is described in one of our other copending applications, application Ser. No. 453,051, filed on Jun. 2, 2003 and entitled "A Method Of Synchronizing Three Or More Electronic Devices And A Computer System For Implementing That Method."

Figure 12:
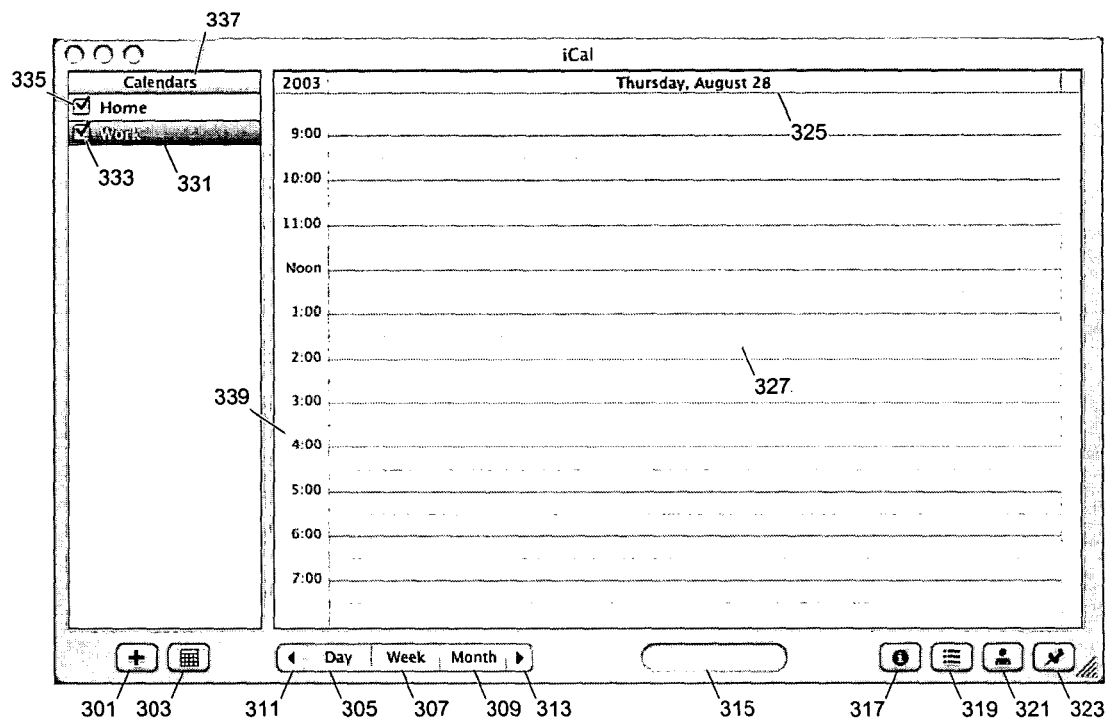
FIGS. 12-32 show example screen images of a user interface according to one embodiment of the present invention.

FIGS. 12-32 show example screen images of a user interface according to one embodiment of the present invention. In FIG. 12, the panel titled "Calendars" (337) shows a list of calendars that are viewable through the user interface. Each calendar may contain information such as events (including subjects and notes), alarms, to do items, and other information, associated with specific days and time. In FIG. 12, two calendars, titled "Home" and "Work" respectively, are shown in the panel; and, checkboxes 333 and 335 indicate whether or not the information of the corresponding calendars is to be displayed in the viewer (e.g., table 327). If a checkbox (e.g., 333) is checked, the information from the corresponding calendar (e.g., "Work") is displayed in the viewer; otherwise, the information from the corresponding calendar is not displayed. In one embodiment, one of the calendars can be selectively highlighted (e.g., 331) so that the highlighted calendar is regarded as the default calendar; when a user adds a new event (or to do item) using the viewer (e.g., table 327), the new event is added to the default calendar unless the user specifies a different calendar.

Figure 17:
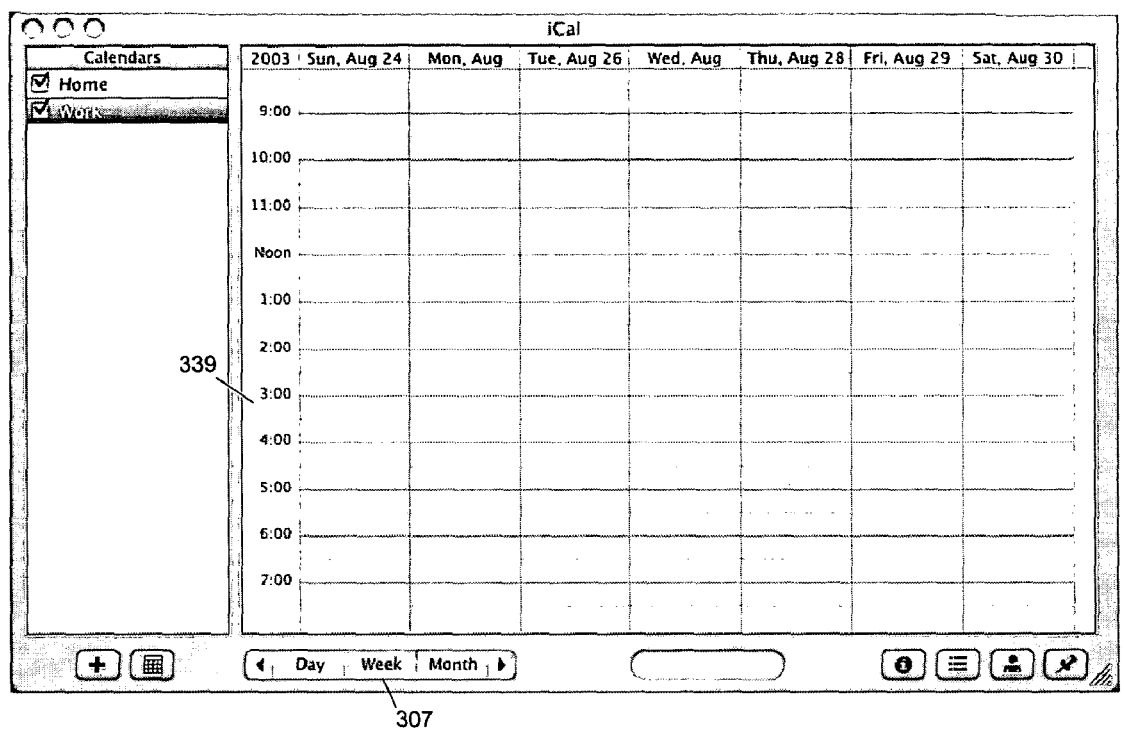
Figure 18:
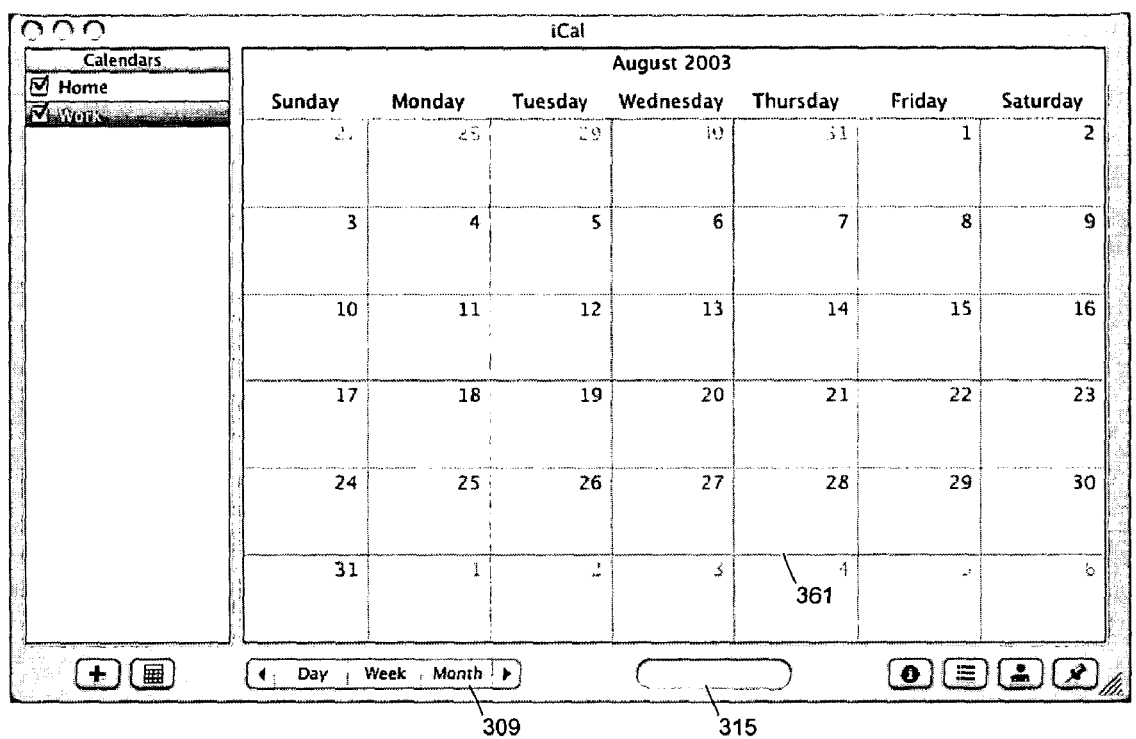

In FIG. 12, view 327 presents information in a table format. The calendars can be viewed one "Day" (305) at time, or one "Week" (307) at a time or one "Month" (309) at a time. A user can switch between different viewing formats through selecting one of buttons 305, 307 and 309 to view according to day, week or month. In FIG. 12, the button 305 is selected and lighted; the calendars are viewed one day at a time; title 325 shows the date of the day being viewed; and, timeline 339 shows the time of the day for the information marked on the calendars on this day. If button 307 (or 309) is pressed for viewing information one week (or one month) at a time, the view presents information in a table format accordingly, as illustrated in FIG. 17 (or FIG. 18). Icon button 323 can be pressed to show or hide the list of to do items.

Figure 13:
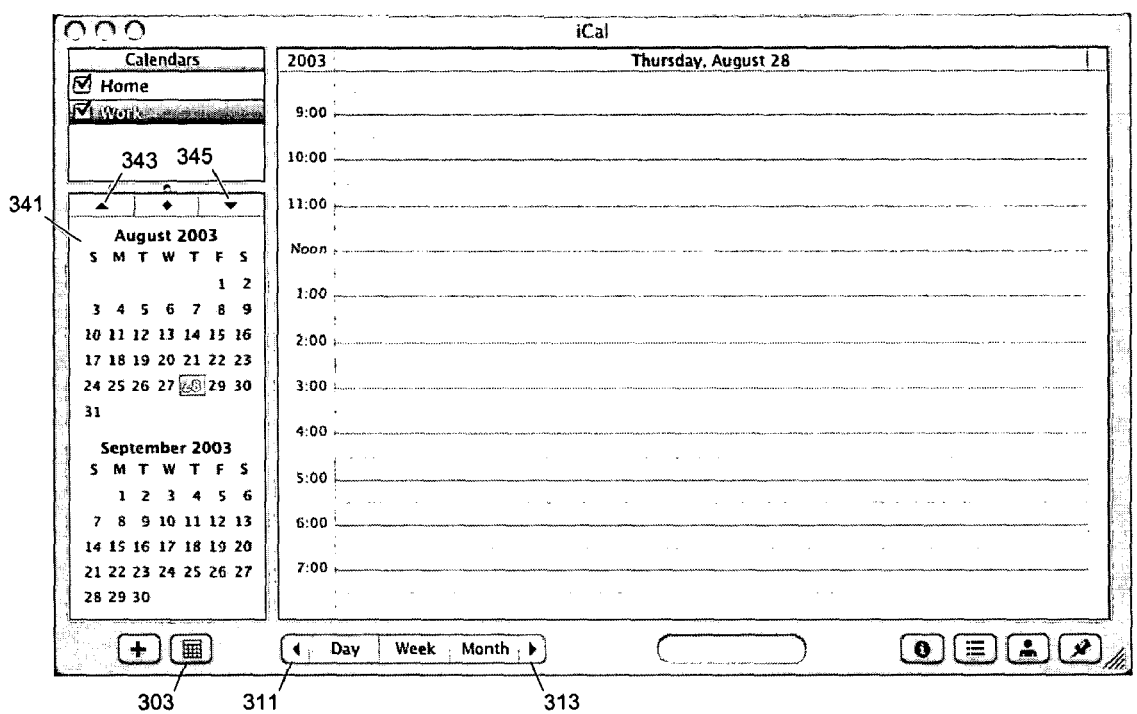
Figure 16:
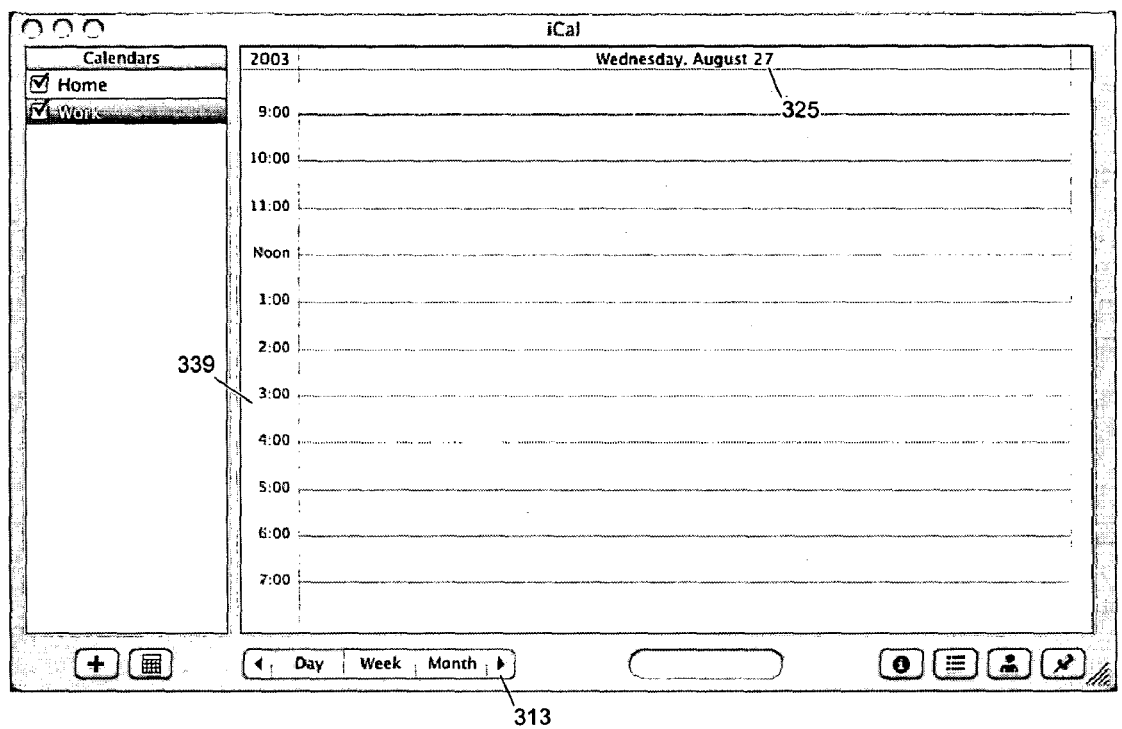

In FIG. 12, icon button 303 is for hiding or displaying the mini-month panel. In FIG. 12, the mini-month panel is hidden. If the user presses button 303, a mini-month panel is displayed, as shown in FIG. 13. In FIG. 13, mini-month 341 shows days within one or more months so that a user can easily select a particular day (or week, or month) for viewing. In the mini-month panel, arrow buttons 343 and 345 can be used to bring the previous months or subsequent months into the mini-month panel for display. For example, in FIG. 13, the days in August and September are currently displayed in the mini-month panel. If arrow button 343 is pressed once, the days in July will be brought into the mini-month panel (and the days in September will be shifted out of the mini-month panel). Similarly, if arrow button 345 is pressed once, the days in October will be brought into the mini-month (and the days in August will be shifted out of the mini-month panel). In FIG. 13, if icon button 303 is pressed, the mini-month panel will be hidden, as in FIG. 12. Similarly, arrow buttons 311 and 313, as shown in FIG. 12, can also be used to select the previous or the next day (or week, or month) for viewing when the view is displaying information one day (or one week, or one month) at a time. For example, in FIG. 12, Aug. 28, 2003 is displayed; if the user presses button 311 once, Aug. 27, 2003 will be displayed, as illustrated in FIG. 16. Similarly, if button 313 in FIG. 16 is pressed once, the day for viewing will be changed from Aug. 27, 2003 to Aug. 28, 2003.

Figure 14:
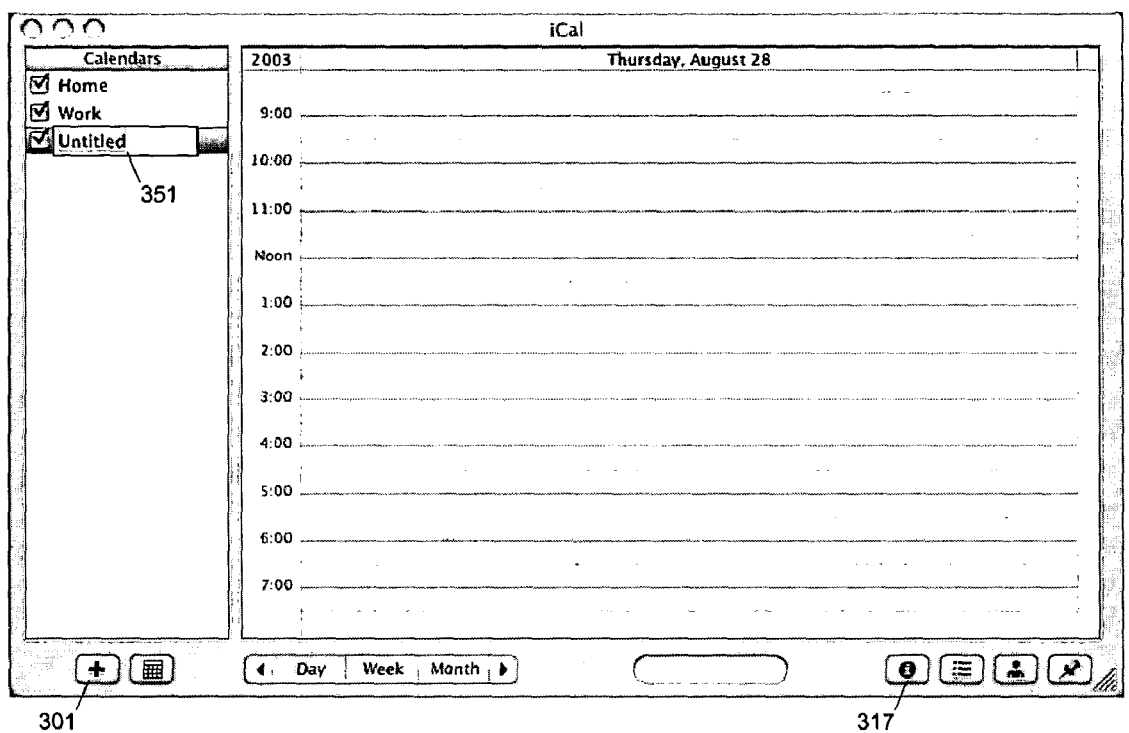
Figure 15:
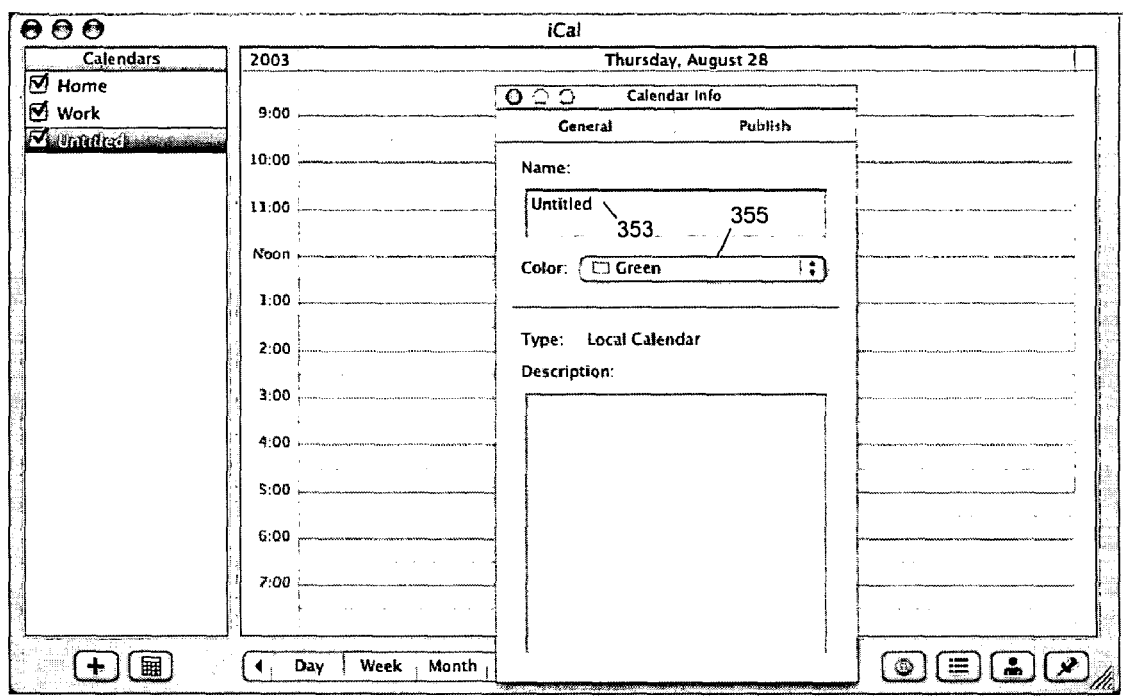

In FIG. 12, icon button 301 can be pressed to create a new calendar. For example, if icon button 301 is pressed in FIG. 12, a new calendar named "Untitled" (351) is created, as illustrated in FIG. 14. A default name, such as "Untitled", is provided for the new calendar. Further, input box 351 accepts text inputs for a replacement name, if the user chooses to do so, immediately after the new calendar is created. Various attributes of the calendar can be set (e.g., by highlighting the calendar as the default calendar and pressing information button 317). Information button 317 can be used to invoke a user interface to inspect and adjust the attributes of a selected calendar (or a selected event, or a selected to do item). For example, in FIG. 14, when information button 317 is pressed, "calendar info" window is displayed, as shown in FIG. 15. Using the "calendar info" window, the name of the calendar can be adjusted in field 353; and, a primary color can be selected for the calendar using color chooser 355. Once a user selects a primary color (e.g., orange) for a calendar, information from the calendar are displayed using user interface elements with the primary color and secondary colors that have the same color tint as the primary color for easy recognition. In one embodiment of the present invention, an arbitrary color can be chosen for a calendar as the primary color; and, the secondary colors for the user interface elements associated with this calendar are automatically generated from the primary color of the calendar. Further details on the determination of the secondary colors for the user interface elements according to a selected primary color are described further below.

Figure 19:
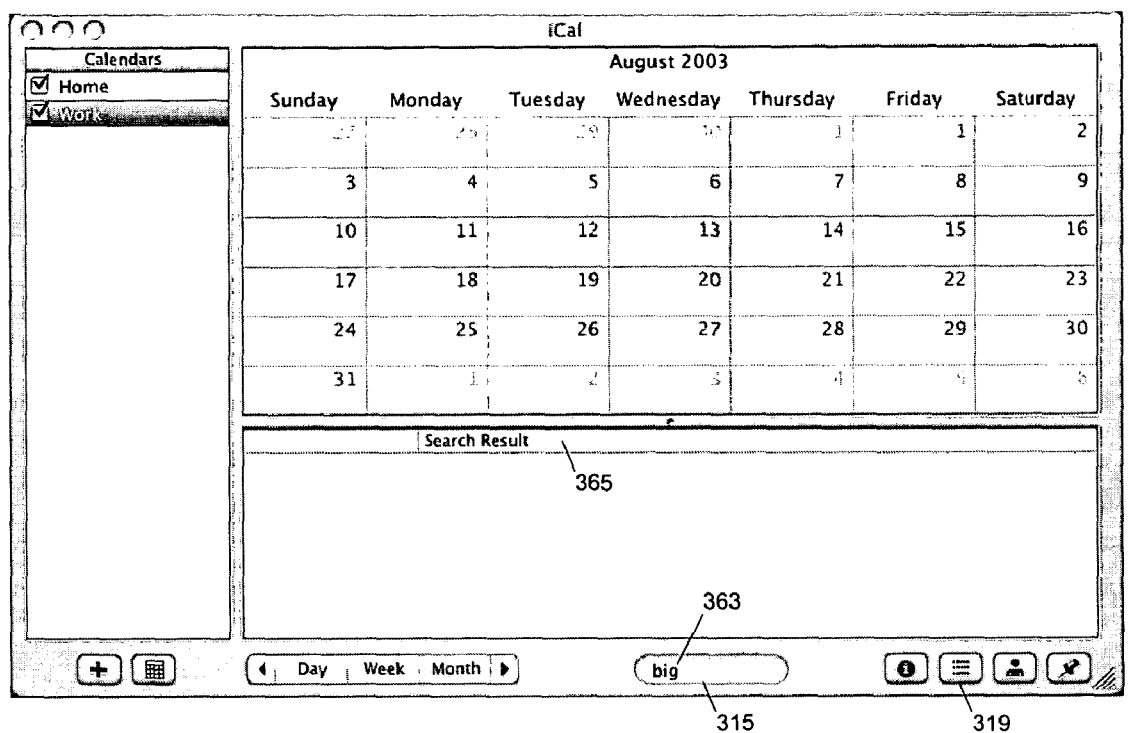

In one embodiment of the present invention, the information in the calendars can be searched. For example, in FIG. 18, text entry 315 can be used to input one or more search terms. For example, if a search term (e.g., "big" 363) is typed in text entry 315, a search result panel (365) appears automatically, as shown in FIG. 19. In FIG. 19, the view panel is reduced in size to make room for the search result panel (365). If the text in text entry 315 is cleared, the search result panel is hidden automatically. Alternatively, a user may press button 319 to hide or show the search result panel.

Figure 20:
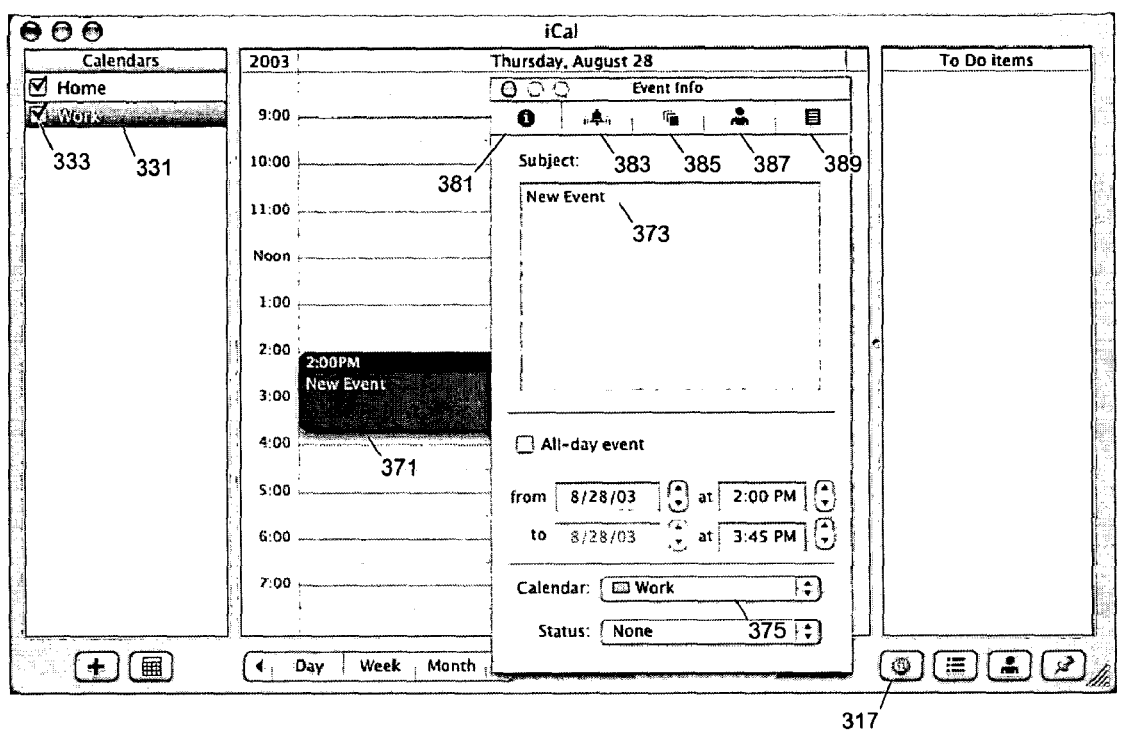

In one embodiment of the present invention, the user can directly create an event in the default calendar (e.g., calendar "Work" 331 highlighted in FIG. 20) using the viewer (e.g., by entering text that representing the subject of the event on a location that corresponds to a time slot in the viewer). For example, the user may generate a new event which is represented on the viewer as patch 371, resize the patch to change the time span of the event, and use "event info" window to view, set or change the attributes of the events. The "event info" window may be invoked through double clicking on the event (371), or pressing information button 317 while the event is selected, or through a voice command to a voice recognition system, or through other methods. In the "event info" window, the user may select tabs 381-389 to see the user interfaces for adjustment of general event attributes, alarm settings, options for repetitions, invitation, and notes for the event. FIG. 20 shows some general event attributes, such as subject 373, calendar color 375, time span information and others.

Figure 21:
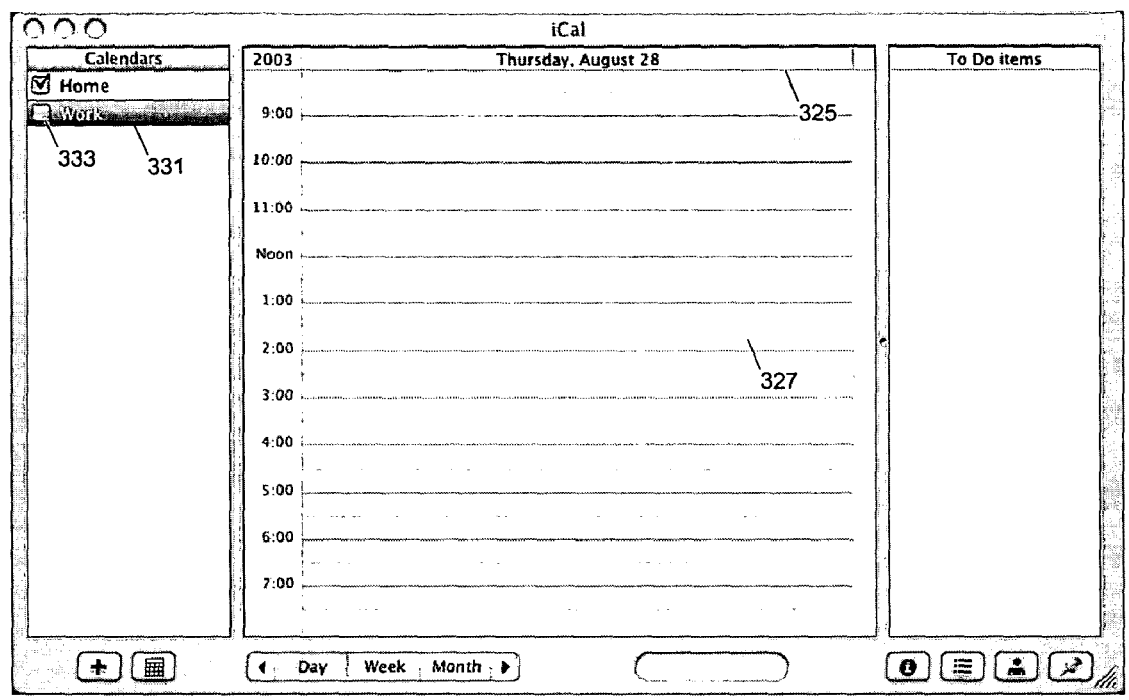

In one embodiment of the present invention, the default calendar can also be toggled for display or not display. For example, after the creation of event 371, a user may toggle button 333 to hide the event for the default calendar 331, which is currently being highlighted; then, the user interface may appear as illustrated in FIG. 21. In FIG. 21, calendar 331 is still highlighted. Since button 333 for calendar 331 is not checked, events for calendar 331 are not displayed in viewer 327 (e.g., event 371 is not displayed). The events for other calendars that are checked for display are display in the viewer for the day (or week, or month) indicated by the title of the viewer (325).

Figure 22:
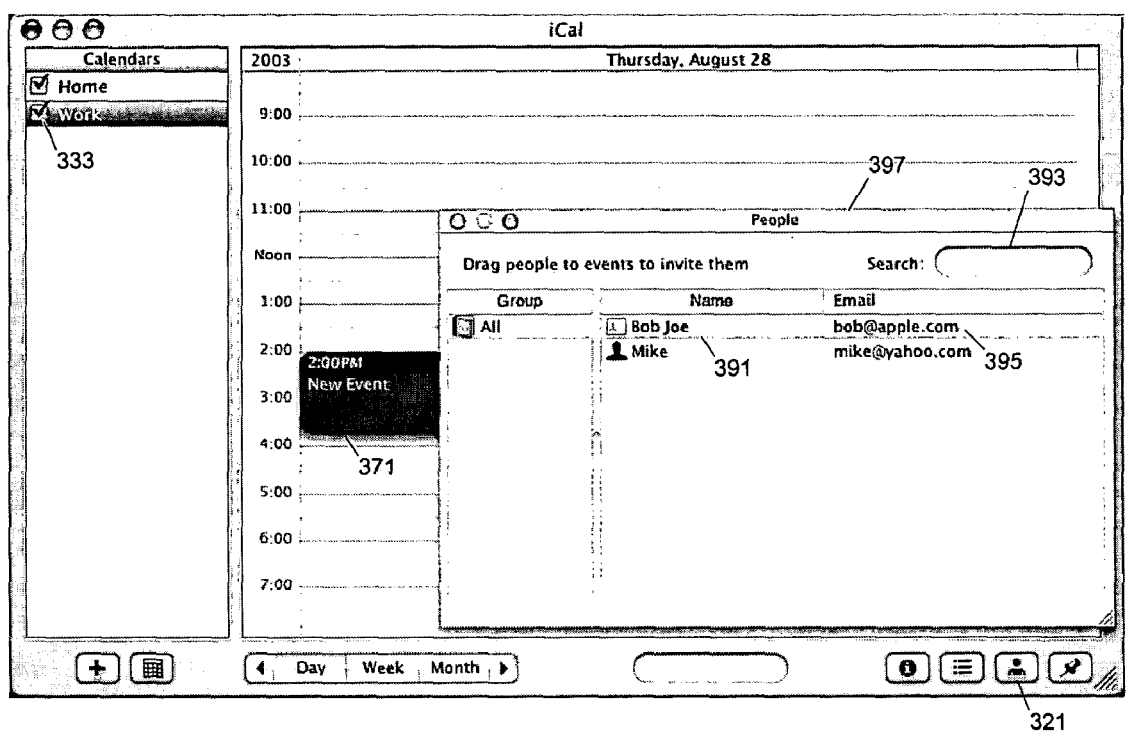

In FIG. 22, button 321 can be used to display or hide the address cards for inviting guests to events. When button 321 is pressed to display the address cards, the address information in one or more address books (which may be maintained by the program with calendars or by other programs that the program with calendars can communicate with) are displayed. For example, in FIG. 22, a list of address cards is displayed in window 397 so that the user can selectively invite guests to events. Search box 393 can be used to search for a particular guest. In FIG. 22, the name and email information are displayed for each address card. To invite a guest to an event, one can drag an address card into the event (e.g., by clicking and holding a button of a mouse when the curser is on name 391 or email 395, controlling the mouse to move the curser into a region representing event 371 and releasing the button while the curser is in the region representing event 371). When one or more guests are invited, an icon is displayed on the title of the event (e.g., icon 399 in FIG. 23). In one embodiment of the present invention, the invitation is sent through email. Once the address card is dropped in the event, the email address for the invited guest is kept for an email message (e.g., a message generated automatically based on the information collected for the event).

Figure 23:
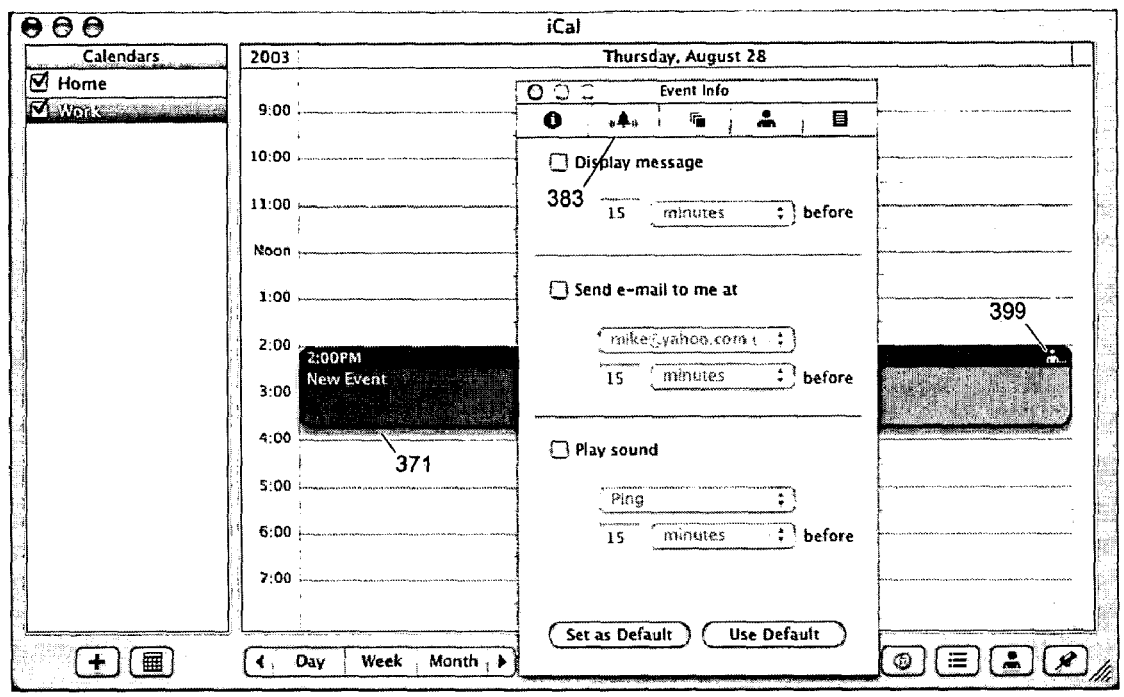

FIG. 23 illustrates one example of setting alarms for an event. In FIG. 23, one may set an alarm at a time specified by the user (e.g., 15 minutes before the event) as at least one of: a message displayed on the display device of the data processing system on which the program with calendars is running, an email message, and a playback of an audio clip.

Figure 24:
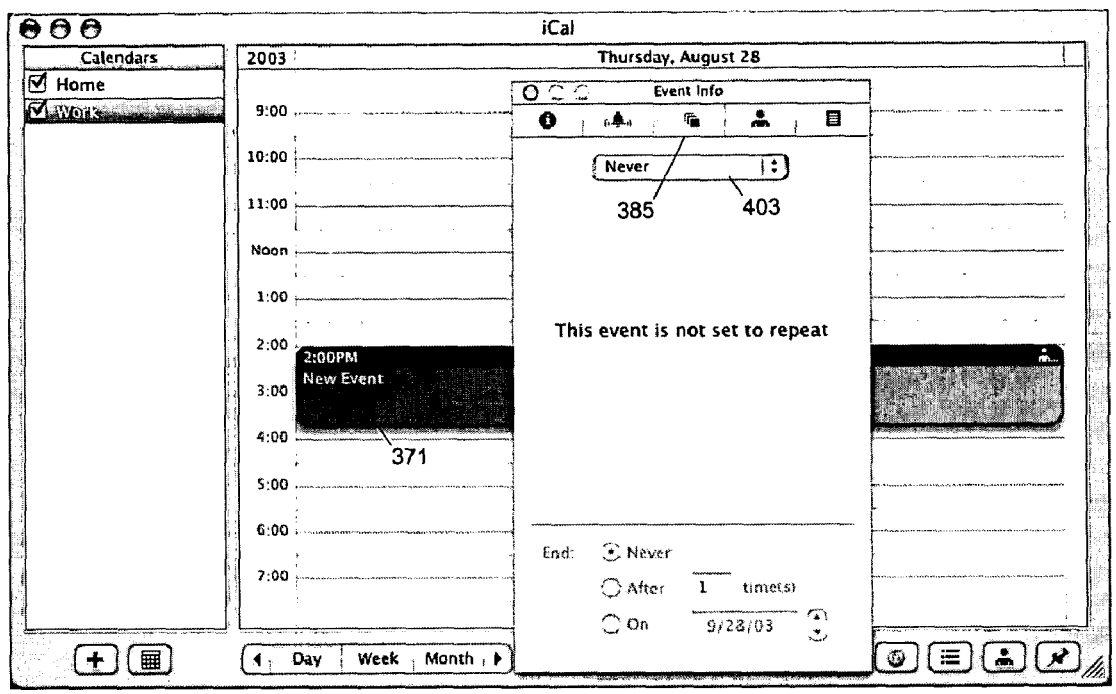
Figure 25:
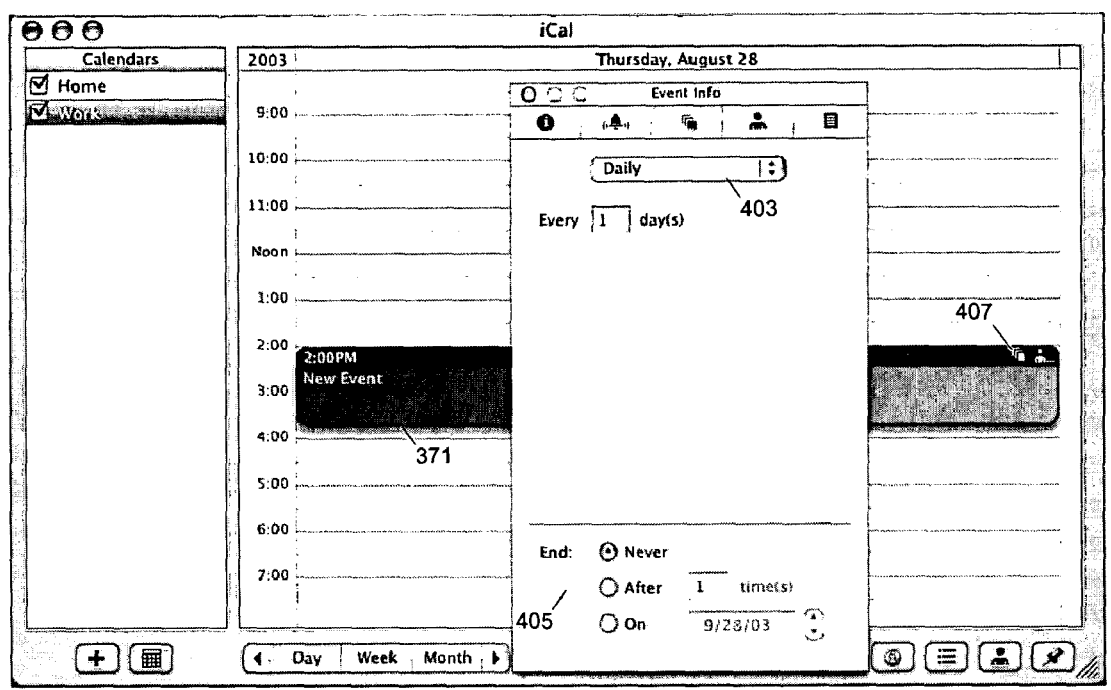

FIGS. 24 and 25 illustrate examples of specifying an event for repetitions. FIG. 24 shows that the event is not set to repeat. However, a use may designate the event as a daily (or weekly, or monthly, etc) event using selection box 403, as illustrated in FIG. 25. In FIG. 25, the event is specified as a daily event that repeats every one (1) day and never ends. The use can set the period (or frequency) for the repetition of the event and the time when the repetition ends. When the event is set to repeat, an icon (e.g., 407) appears on the title bar for the event to indicate that the event is a recurring event.

Figure 26:
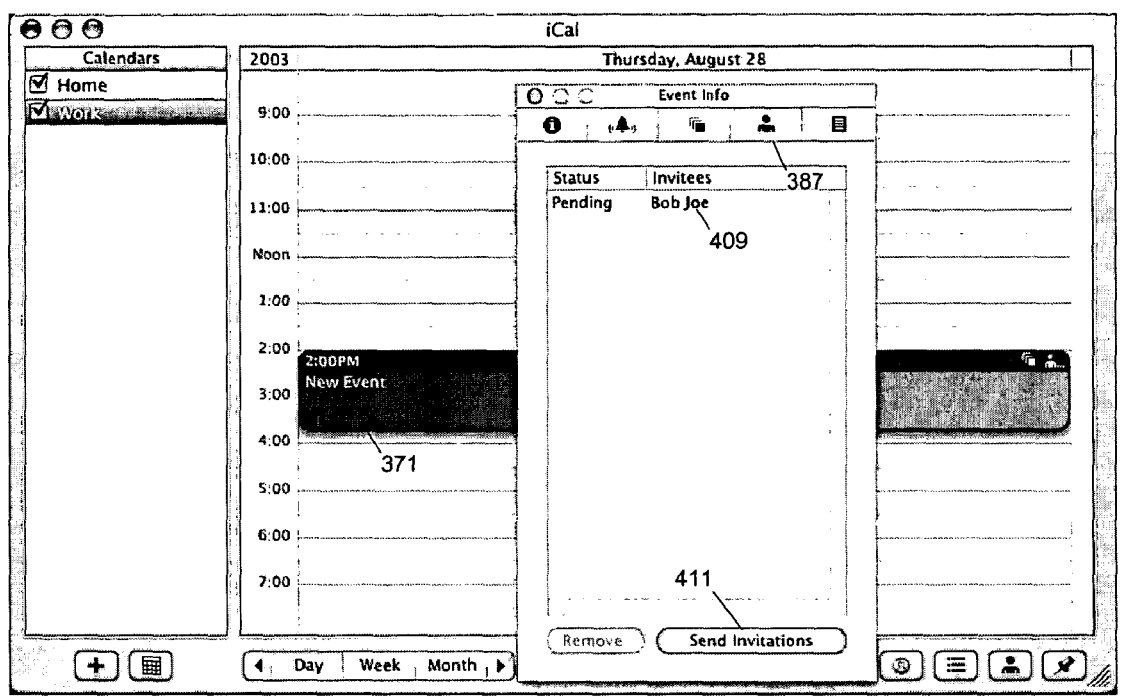

FIG. 26 shows an example of managing invitations for an event. In FIG. 26, a listed of invitees are shown, with status information to indicate whether the invitation is still pending, or already sent. A user can use the interface to send invitations using button 411, if the invitation for an invitee is still pending.

Figure 27:
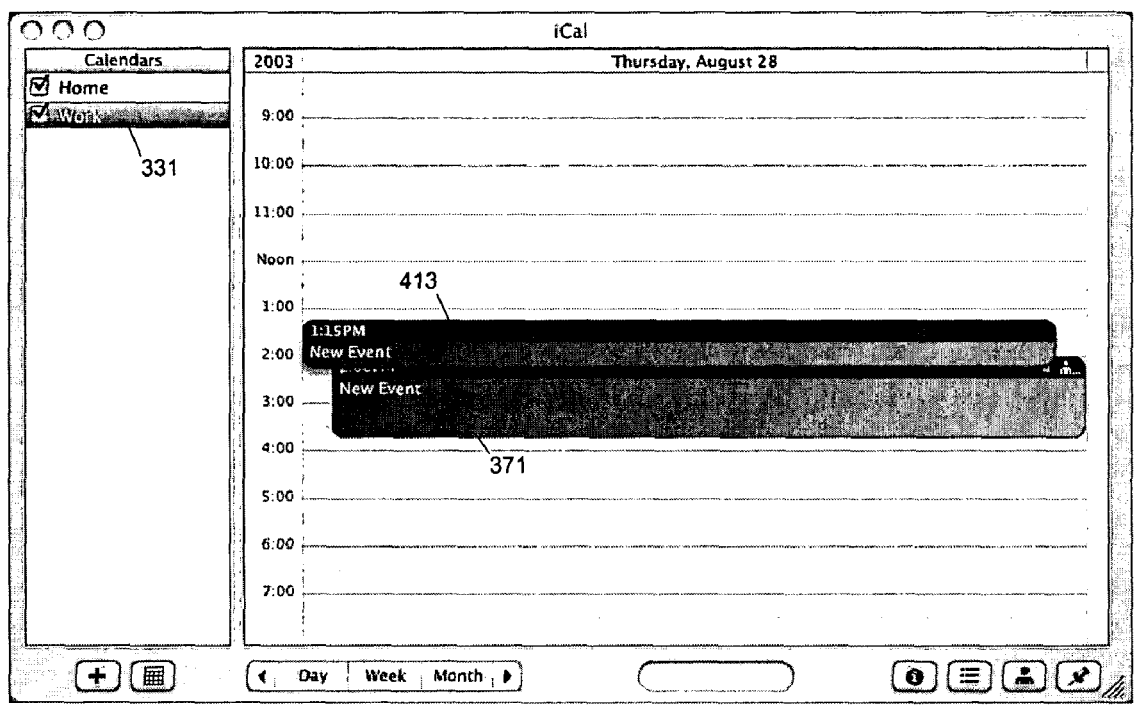
Figure 28:
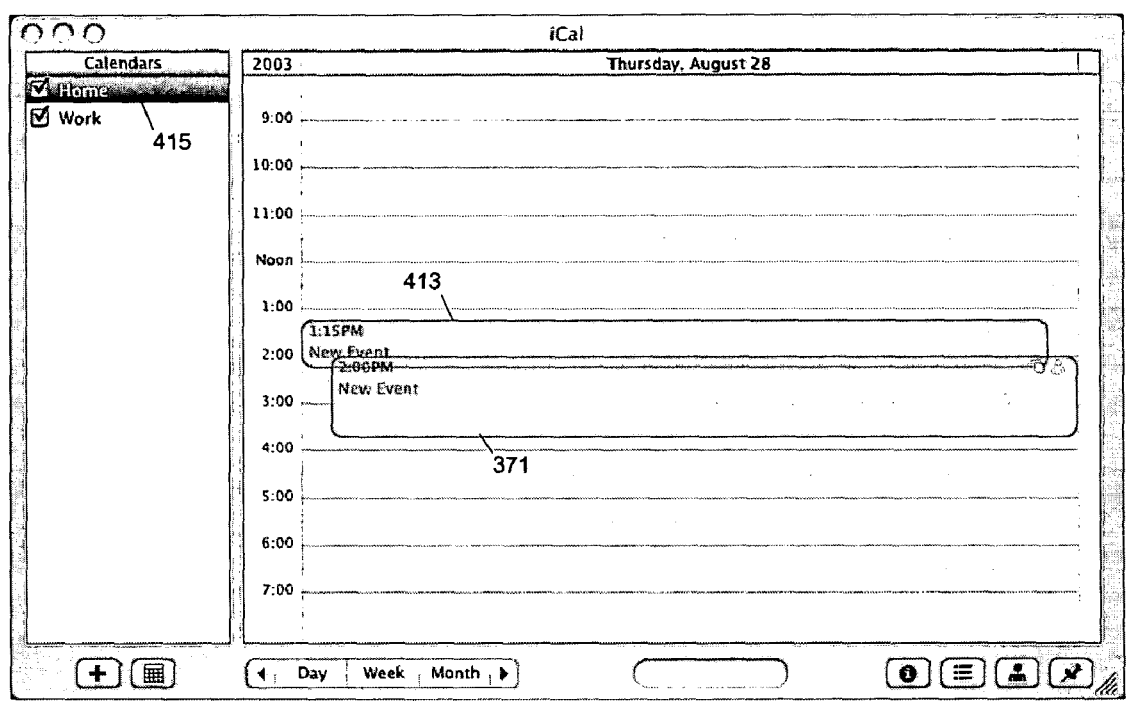

FIG. 27 shows an example of displaying two events overlapping in time. When two events overlap in time, the event patches (e.g., 413 and 371) are displayed as cascaded images so that the user can clearly see the individual patches as well as the overlapping. In FIG. 27, the two events are in the calendar 331, the default calendar ("Work"); and, the event patches from the default calendar (e.g., 413 and 371) are displayed with high contrast for highlighting. In FIG. 28, the default calendar becomes calendar 415 ("Home"), the event patches from the non-default calendar (e.g., 413 and 371) are displayed with low contrast (and with translucency) so that the events from the default calendar, if there is any, will be apparent among the events from the non-default calendars.

Figure 29:
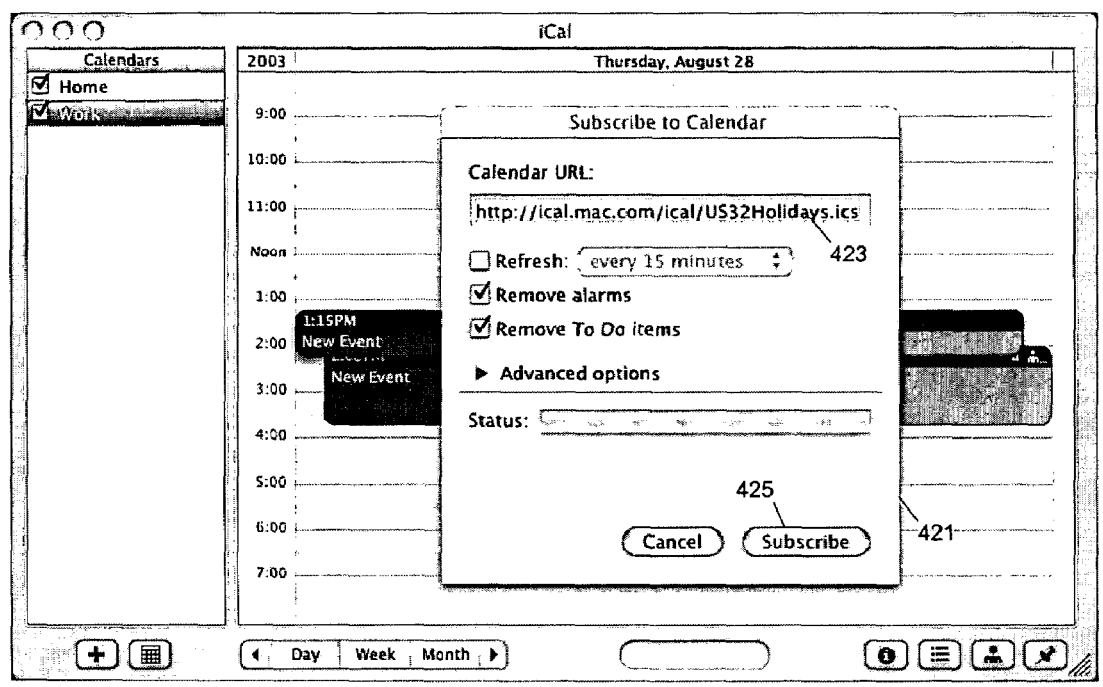
Figure 30:
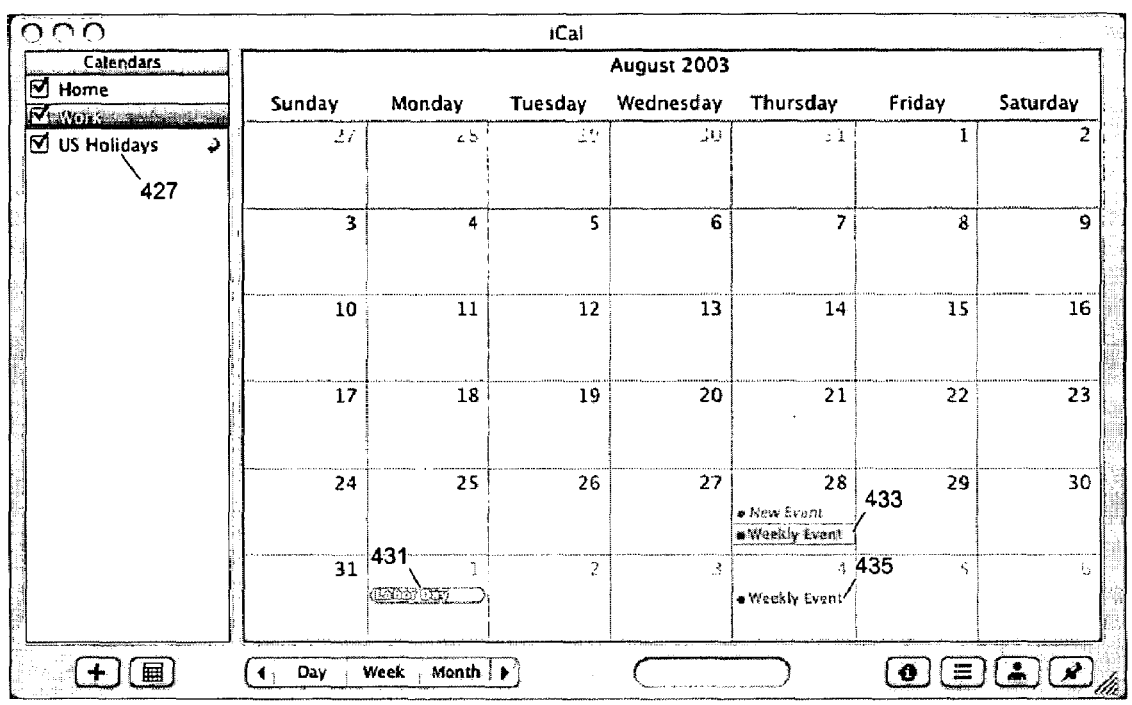

FIG. 29 illustrates an example to subscribe to an calendar. After the user enters the URL (Universal Resource Locator) of the calendar to be subscribed (e.g., in entry box 423) and presses button "subscribe" (425), the program downloads calendar information from the specified URL to create a subscribed calendar. A user may selectively remove information (e.g., alarms, to do items, etc. from the subscribed calendar). Further, the user may specify a period for the program to automatically refresh the subscribed calendar (e.g., periodically download the calendar information from the specified URL to update the subscribed calendar). For example, after the user subscribes to a calendar "US Holidays" at URL 423 (FIG. 29), a new calendar (427) appears in the list of calendars, as shown in FIG. 30. In FIG. 30, holidays (e.g., 431) appears in the viewer with other events from the calendars selected for display. In FIG. 30, event 433 is a repeating event; and, the viewer automatically displays the expected occurrences 433 and 435 according the repetition period of the event.

Figure 31:
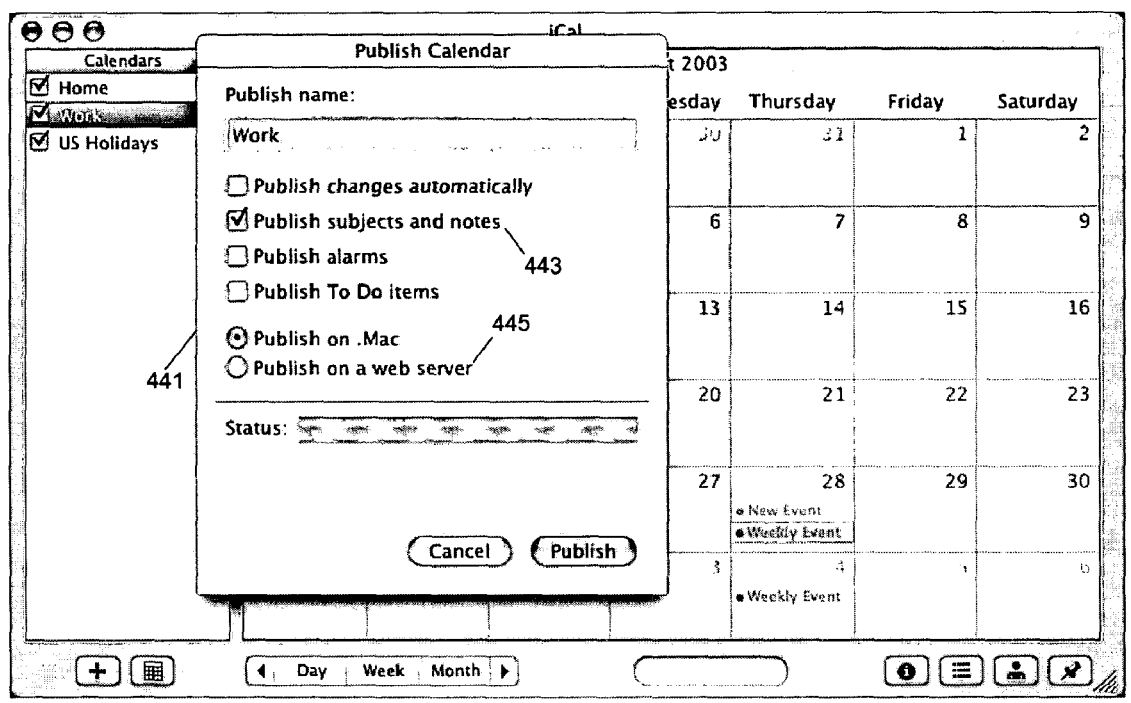
Figure 32:
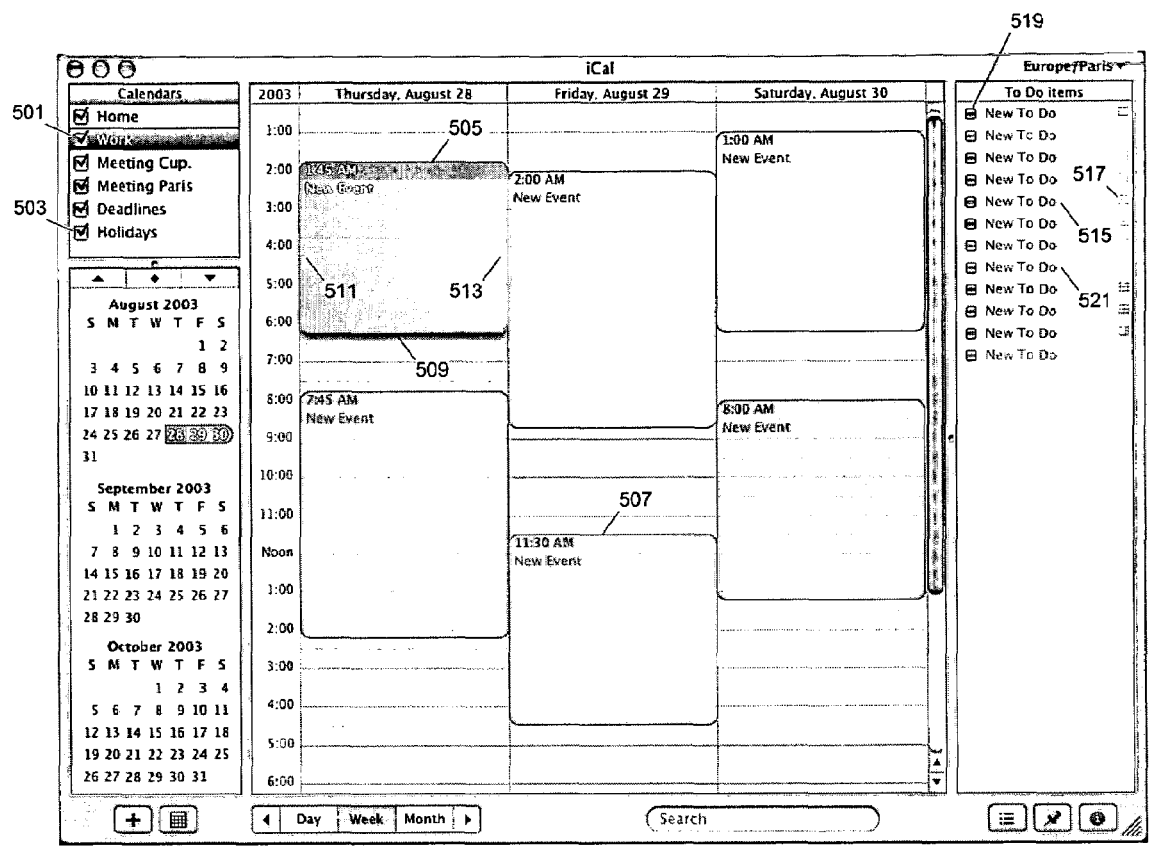

FIG. 31 shows an example of selectively publish a calendar on a server (e.g., on Mac or a web server). A user may choose to publish or not publish the changes automatically; and, the user may specify the types of information (e.g., subjects, alarms, to do items) that are published with the calendar. Thus, with the capability of publishing and subscribing to one or more calendars, users of different data processing systems at different locations can easily cooperate with each other (e.g., in scheduling events and to do items).

In one embodiment of the present invention, each calendar is assigned one color. For example, in FIG. 32, calendar 501 is in one color (e.g., orange); and, calendar 503 is in another color (e.g., blue). User interface elements for different calendars have the colors of different tints based on the respective colors of the calendars for easy recognition. For example, event 505 of orange calendar 501 is displayed with colors of orange tint. For example, title 505 is in a darker orange background; and, subject 509 is in a gradient background with orange tint (e.g., with a slightly darker orange color on the left hand side 511 and a slighter brighter orange color on the right hand side 513). Further, to do items for different calendars are also displayed with different colors, which are derived from their respective calendar colors. For example, to do item 515 of calendar 501 is displayed with an orange foreground text color; and, strips 517 for to do item 515 are painted with solid colors of an orange tint. Further, icon 519 for a to do item has an image generated with a tint of the respective calendar. Similarly, event 507 of blue calendar 503 is displayed with a blue tint; and, to do item 521 of blue calendar 503 is displayed with a blue foreground text color, blue strips and an icon with a blue tint.

In one embodiment of the present invention, a set of limited main calendar colors are pre-designed for a number of calendars. For the set of limited main colors, the colors of various user interface elements (e.g., the background color of the title bar of an event, the colors for the generation of the gradient background of the subject of the event, the color for the generation of an icon image for a to do item or the checkbox of a calendar, the foreground text color of a to do item, etc.) are pre-designed for each of the set of limited main calendar colors. The colors for the user interface elements are pre-designed in terms of both aesthetic criteria and readability. Thus, when a user selects one from the set of main colors for a calendar (e.g., using the color selection box 375 in FIG. 20), the program automatically uses the set of colors pre-designed for the selected main calendar color in different user interface elements associated with the calendar.

Figure 33:
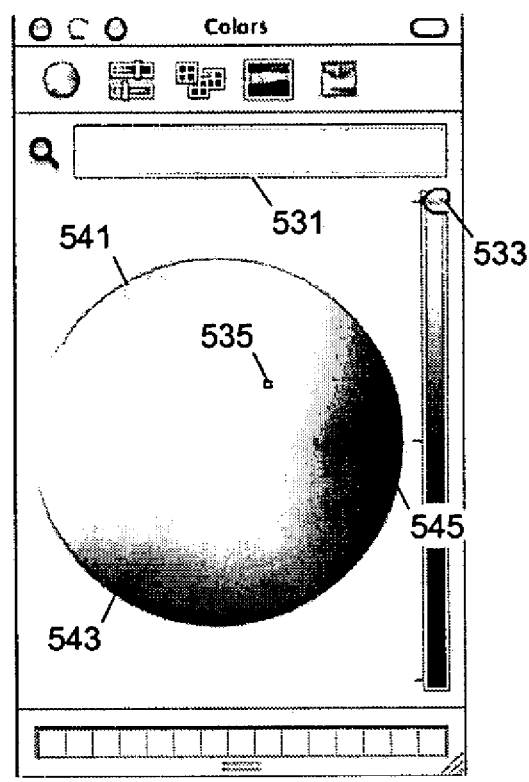
FIGS. 33-35 show example screen images of color choosers, which can be used with embodiments of the present invention for selecting color schemes for a plurality of user interface elements.
Figure 34:
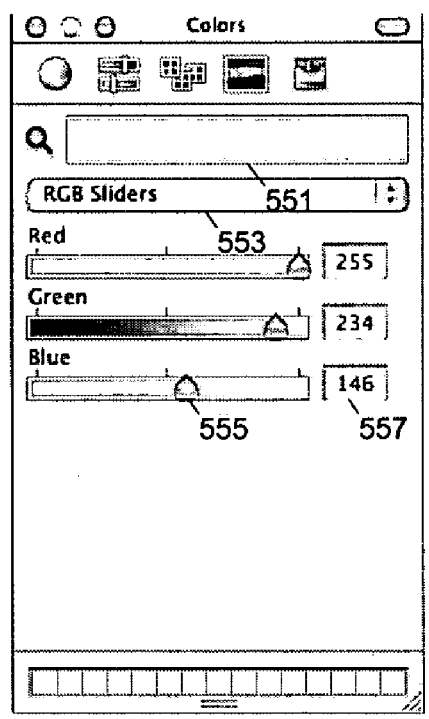
Figure 35:
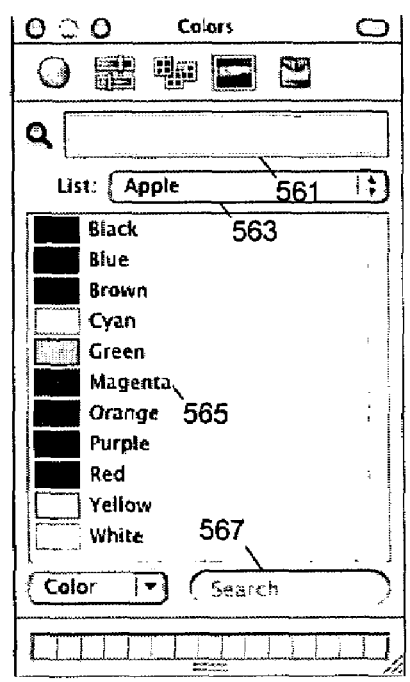

However, if the calendar colors can be chosen only from the set of pre-designed main calendar colors, at least two of the calendars will have the same color when the number of calendars exceeds the number of main calendar colors. To avoid the same colors for the calendars and provide more options for users to select a main calendar color, one embodiment of the present invention automatically generates the colors of various user interface elements for a user selected, arbitrary main calendar color (e.g., using an interpolation scheme based on the set of pre-designed main colors and the pre-designed colors for the user interface elements for their respective main calendar colors). Thus, a user may arbitrarily select the main color for a calendar (e.g., using a color chooser as illustrated in FIGS. 33-35), without having to select from a limited set of pre-designed colors. FIG. 33 shows a user interface which presents, in one exemplary embodiment, a color wheel which resembles a full color spectrum (e.g., a rainbow). The colors in the color wheel may be displayed such that the range of colors appear to vary in a substantially continuous manner (e.g., from shade of red to shade of orange, etc.) It will be appreciated that the colors may vary in steps (in a quantized manner) but that the variation will normally be perceived as substantially continuous. For example, in FIG. 33, the user may click on point 535 to select a color (e.g., to select a color for one calendar which will differ from other calendars displayed in a calendar interface), where regions 541, 543 and 545 provide various shades of green, blue and red colors with different saturation along the radius of the color wheel. In FIG. 33, slider 533 controls the brightness of the selected color; and, the selected color is displayed in area 531. Alternatively, a use may use sliders (e.g., RGB sliders, such as blue slider 555, in FIG. 34) to select a color value for a color component or directly specify the color value for the color component (e.g., blue value in entry box 557 in FIG. 34), or select one color from a color palette (e.g., palette illustrated in FIG. 35). The color chosen by the user is then used as the main color of the calendar. Once the main color of the calendar is selected, the colors of the user interface elements associated with the calendar are automatically determined, by the data processing system without user intervention, for the calendar (e.g., text colors, header colors, colors for the generation of icon images, gradient background, etc).

In one embodiment of the present invention, different colors for user interface elements associated with a calendar are individually computed for the selected calendar color using an interpolation scheme (which is a predetermined mathematical process) based the pre-designed colors for the user interface elements from the pre-designed main calendar colors. For example, a color for a user interface element (e.g., a darker color of the same color tint, which can be used as the background color of an event header 505) may be represented as 3 components (H, S, B), where H is the Hue, S the saturation, and B the brightness. For the pres-designed main calendar color ($H^m_i, S^m_i, B^m_i$), the respective pre-designed color for the user interface element is ($H^p_i, S^p_i, B^p_i$), where i=1, 2, . . . , n; and, n is the total number of pres-designed main colors. When a user selects a calendar color ($H_s, S_s, B_s$) an interpolation scheme is used to compute the color for the user element $(H_c, S_c, B_c)$ based on $(H_s, S_s, B_s)$, $(H^m_i, S^m_i, B^m_i)$, and $(H^p_i, S^p_i, B^p_i)$ (i=1,2, ..., n). For example, a piecewise linear interpolation function may be used to interpolate the Hue, Saturation and Brightness according to $H_s$, $S_s$ and $B_s$. In general, a three-dimensional interpolation function is constructed to perform the interpolation. It is understood that various numerical schemes known in the field of numerical analyses can be used to construct the interpolation. Further different constraints can be applied to the interpolation for various aesthetic reasons, readability requirements, and others.

In one embodiment of the present invention, the overall interpolation functions for a color of a user interface element (e.g., a foreground text color) may be a discontinuous function of the selected main calendar color. If all interpolation functions for different user interface elements are interpolated using continuous functions, it is possible that one selected calendar color may lead to the same color (or very similar colors) for the foreground and background of a user interface element. This would cause readability problems, since the foreground and background are undistinguishable (or very difficult to distinguish from each other). Thus, for some user interface element colors, interpolations with discontinuities can be used to such that the computed colors are pleasing in terms of both aesthetic criteria and readability.

In one embodiment of the present invention, two continuous piecewise linear interpolation functions are used for the computation of one user interface element color for the selected main calendar colors in two different regions in the color space (e.g., a dark region and a bright region). When the selected color for the calendar is in a first region in the color space, a first piecewise linear interpolation function is used to compute the user interface color; when the selected color for the calendar is in a second region in the color space, a second piecewise linear interpolation function is used to compute the user interface color. For example, when the selected main calendar color is a bright color, one interpolation scheme (e.g., a piecewise linear interpolation) is used to compute a foreground color for text that is on a gradient background; and, when the selected calendar color is a dark color, another interpolation scheme (e.g., a constant color, such as white) is used to obtain the foreground color. Thus, the overall interpolation function for the user interface color may be discontinuous (e.g., the computed color jumps when the selected main calendar color moves from a light region to a dark region). It is understood that the color space may be divided into more than two regions for discontinuous interpolation (e.g., for readability and aesthetic criteria). From this description, it will be apparent to one skilled in the art that the interpolation functions for the colors can be designed such that the computed colors from the interpolation functions are aesthetically pleasing and suitable for reading when used in displaying the user interface elements.

Figure 36:
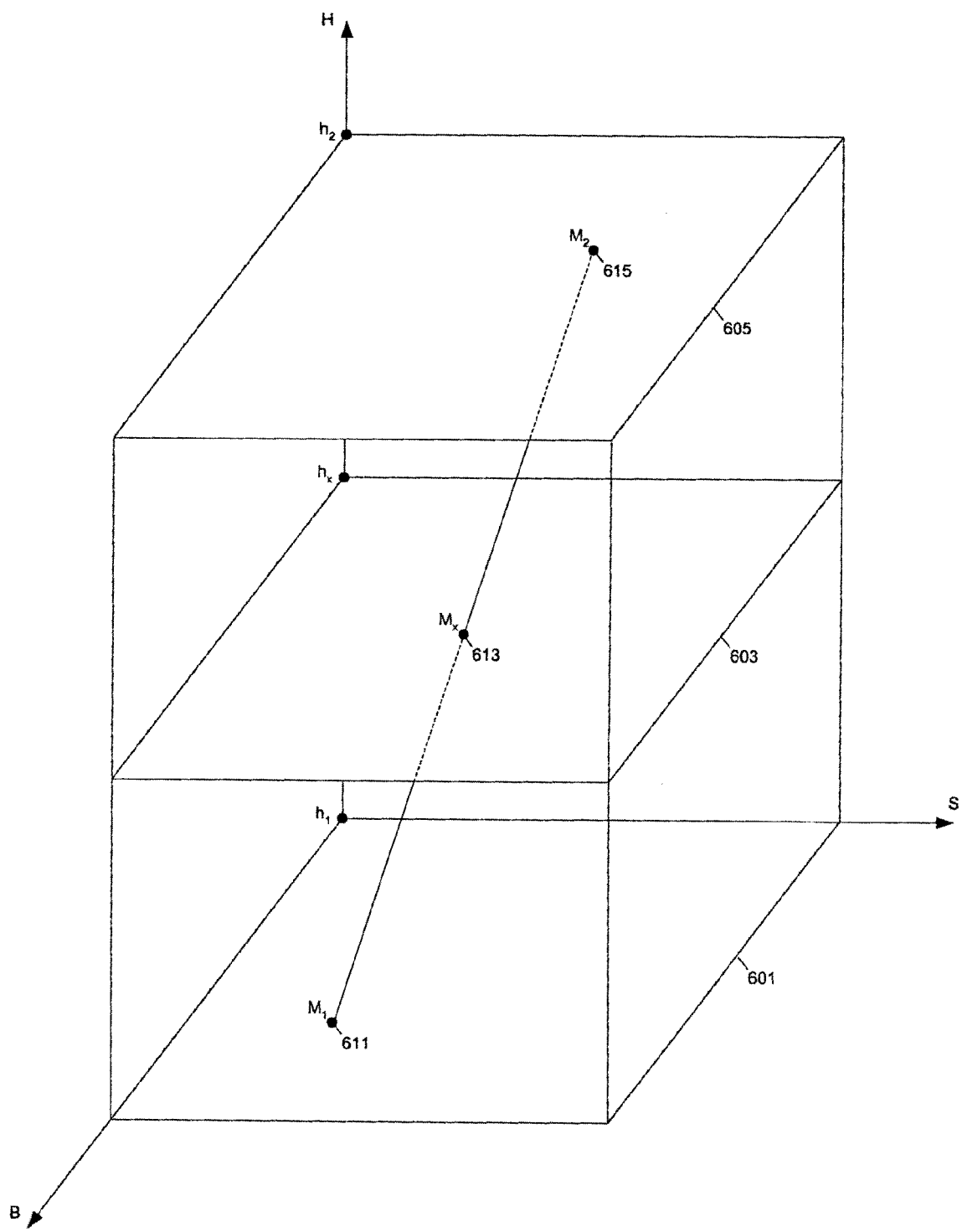
FIGS. 36-37 show an example interpolation scheme for the computation of a color based on a user selected color according to one embodiment of the present invention.
Figure 37:
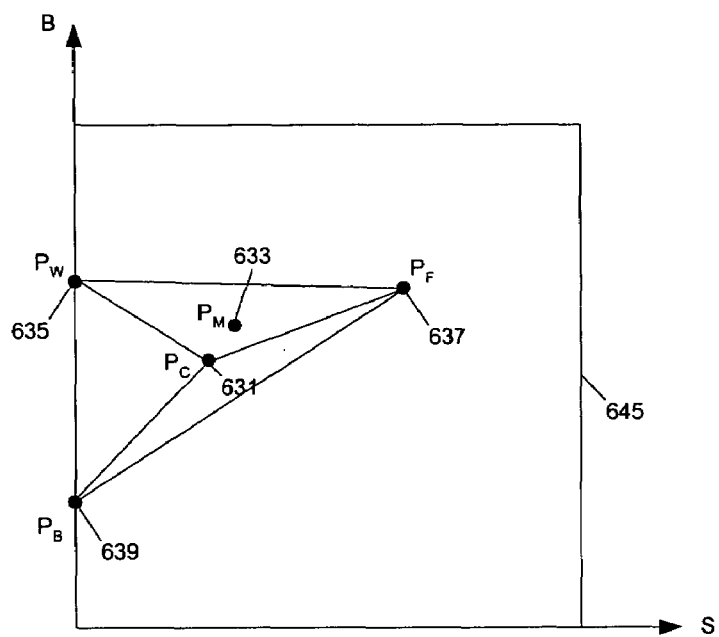
Figure 37:
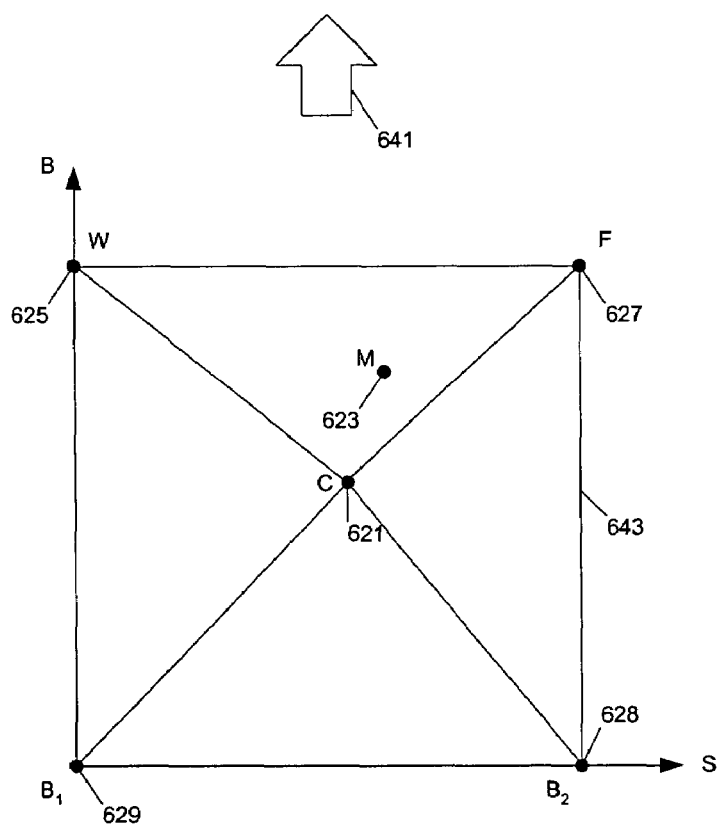

FIGS. 36-37 show an example interpolation scheme for the computation of a color based on a user selected color according to one embodiment of the present invention. To simplify the interpolation, one embodiment of the present invention uses a linear interpolation to first locate the control points on a SB plane (e.g., a plane in the HSB color space with a constant Hue (H) value but different Saturation (S) and Brightness (B) values). FIG. 36 illustrates an example of the linear interpolation of a control point. On SB plane 601 where $H=h_1$, the control point is at $M_1$ (611); and, on SB plane 605 where $H=h_2$, the control point is at $M_2$ (615). Using a linear interpolation scheme (or other higher order interpolation schemes, which may use known control points on more than two SB planes), the position of the control point $M_x$ on SB plane 603 where $H=h_x$ can be obtained. In FIG. 36, the linear interpolation for different Hue values is represented by line segment $M_1M_2$ in the HSB color space. Once the control points in the SB plane where $H=h_x$ are located, a two-dimensional interpolation scheme can be used to interpolate the color in SB plane, as illustrated in FIG. 37. In one embodiment of the present invention, the interpolation is such that the computed color has the same Hue value $h_x$ as the selected main color.

FIG. 37 illustrates a mapping (641) between the derived colors and the selected colors in SB planes. In SB plane 643 for the selected colors, line segment $B_1B_2$ (629 and 628) represent the black point (B=0); point W (625) represents the white point; point F (627) has full saturation and brightness for the given Hue of the SB plane; and, point C (621) is a control point inside SB plane 643. In SB plane 645 for the derived colors (which has the same Hue value of SB plane 643), point $P_B$ (639) represents the color derived from the black point ($B_1$ and $B_2$); point $P_W$ (635) represents the color derived from the white point (W); and, points PC (631) and $P_F$ (637) represent the colors derived from points C (621) and F (627) respectively. Thus, an interpolation scheme can be used to map an arbitrary point for a selected color in $B_1B_2FW$ to a corresponding point for a derived color in $P_BP_FP_W$. For example, a linear interpolation can map a selected color M (623) in CFW to the corresponding derived color $P_M$ (633) in $P_CP_FP_W$; and, region $B_1B_2C$ is mapped into line segment $P_BP_C$.

In one embodiment of the present invention, a designer selects the points C, $P_C$, $P_B$, $P_W$ and $P_F$ for each of a set of different Hue values (e.g., for the pre-designed main calendar colors). When a user selected an arbitrary color with Hue $h_x$, the points C, $P_C$, $P_B$, $P_W$ and $P_F$ in the SB plane of the user selected Hue value $h_x$ are obtained from the linear interpolation scheme as illustrated in FIG. 36 from the corresponding points in the pre-designed SB planes that have Hue values close to the user selected Hue value $h_x$. Then, a mapping in the SB plane of the user selected Hue value, as illustrated in FIG. 37, is used to determine the derived color.

In one embodiment of the present invention, a number of colors of different characteristics are derived from a user-selected primary color. For example, one derived color is brighter than primary color, one derived color darker than the primary color, and one color close to the primary color. These colors are typically selected based on aesthetic and functional reasons; and, continuous interpolation functions are used to generate these derived colors. These colors are then assigned different roles in user interface elements. For example, a dark derived color may be used for the background of the title for an event (e.g., title bar 505 in FIG. 32); and, two derived colors that are close to the primary color are used for the generation of the gradient background (e.g., subject field 509 in FIG. 32). However, assigning colors solely based on the characteristics of the derived colors (e.g., darker or brighter than the primary color, close to the primary color) can lead to readability issues. Thus, in one embodiment of the present invention, at least some of the user interface elements have two or more derived colors as candidates. A discriminator selects one from the candidates for the color of the user interface element to ensure readability. For example, strokeColor is a very dark variant of the primary color; gradientStartColor is a color close to, while a little darker than, the primary color; gradientEndColor is a color close to, while a little brighter than, the primary color; fillColor is a bright variant of the primary color; and, textColor is a dark variant of the primary color. However, if the textColor is used as the foreground color of the text, there may be readability issues for the text on a gradient background when the primary color is a dark color. Thus, the foreground color for the text on a gradient background has two candidates: textColor and white (or fillColor). A discriminator selects one from the two candidates to avoid readability problems. For example, the discriminator selects textColor as the foreground color for the text on the gradient background if the primary color is light and white (or fillColor) as the foreground color if the primary color is dark.

Figure 38:
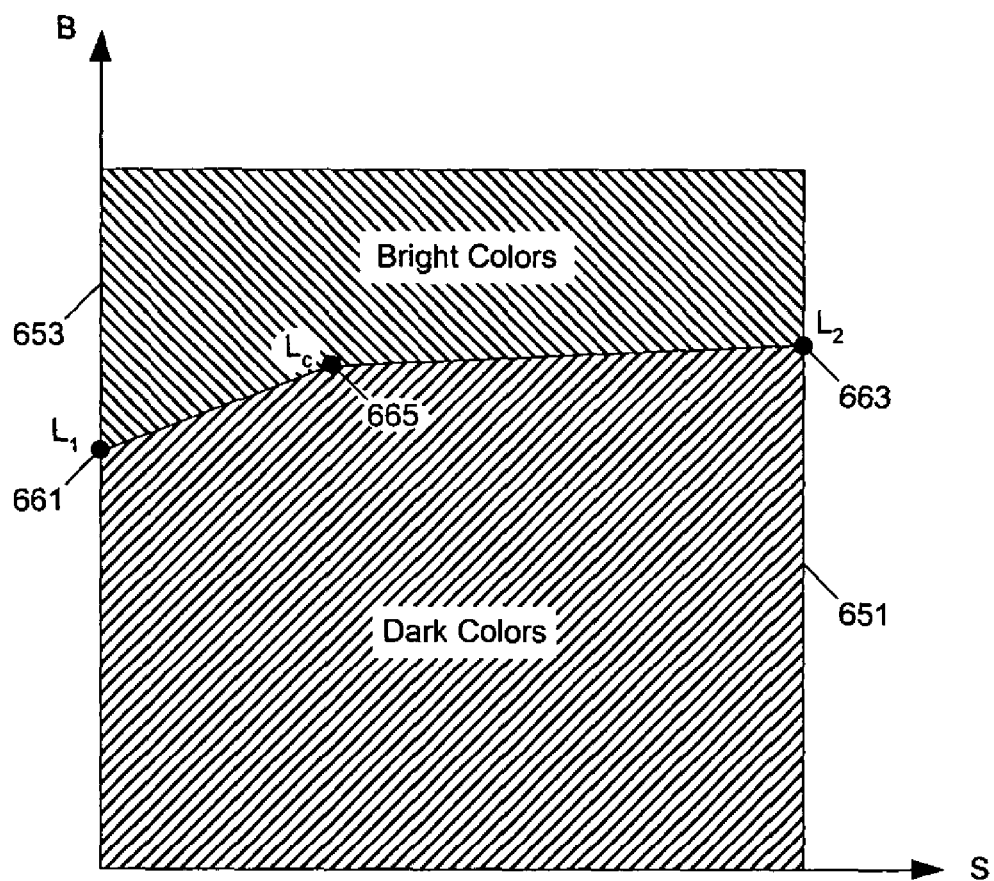
FIG. 38 illustrates a scheme to classify colors for a discriminator according to one embodiment of the present invention.

FIG. 38 illustrates a scheme to classify colors for a discriminator according to one embodiment of the present invention. In FIG. 38, three points in a SB plane of a given Hue value are used to separate the colors in the SB plane into bright colors and dark colors. In FIG. 38, point $L_1$ (661) has S=0, representing a delimiting point in gray scale that separates the bright grays and dark grays. Point $L_2$ on SB plane 651 has full saturation; and, point $L_C$ is selected to best separate the bright and dark colors using lines $L_1L_C$ and $L_CL_2$. In one embodiments, control points $L_C$ and $L_2$ are determined for a number of constant Hue planes for the set of pre-designed main calendar colors; and, a linear interpolation as illustrated in FIG. 36 is used for the determination of corresponding controls points on other constant Hue planes.

In one embodiment of the present invention, a measurement of distance to the delimitating line (e.g., $L_1L_CL_2$) is established. For example, the delimitating line can be mapped so that the measurement of distance to the delimitating line is 0 when a color is on the delimitating line and the measurement of distance to the delimitating line is 1 when the color has full brightness. A discriminator can use the delimitating line to select colors from candidates for readability. Alternatively, a discriminator can select different interpolation scheme (or different sets of control points) for interpolating based on primary colors in different regions (e.g., using a set of control points for piecewise linear interpolation to generate a darker color when the primary color is a bright color and using a constant white color when the primary color is a dark color). Further, the discriminator can use the measurement of distance to the delimitating line for the generation of icon images.

In one embodiment of the present invention, an icon image is generated according to one or more given colors based on one or more layers of images. For example, an icon image for a checkbox with "glass" effect and a shadow can be produced with layers: shadow, color base, upper glass effect, lower glass effect, frame and check mark. Each layer may reference to an image, a color, a filter, and an alpha function for transparency. Since the icon image is computed based on the given layer information, derived colors based on a primary color can also be used to customize the icon image. In one embodiment of the present invention, a discriminator is used to select different effects and filters for different types of colors (e.g., glass effect are generated differently for a dark primary color and a bright primary color). For example, different layers and filters can be selected based on whether or not the primary color is bright or dark.

Since the discriminator causes discontinuity in the generation of icon images (e.g., when the primary color changes from bright to dark, the icon image model jumps from one to another), one may observer inconsistent icon appearances. To provide more consistent appearances, in one embodiment of the present invention, the icon models for different primary colors are mixed according to the closeness of the primary color to the delimitating line. For example, the icon model for a bright primary color can be corrected by mixing it with the dark version according to the closeness of the primary color to the delimitating line.

Figure 39:
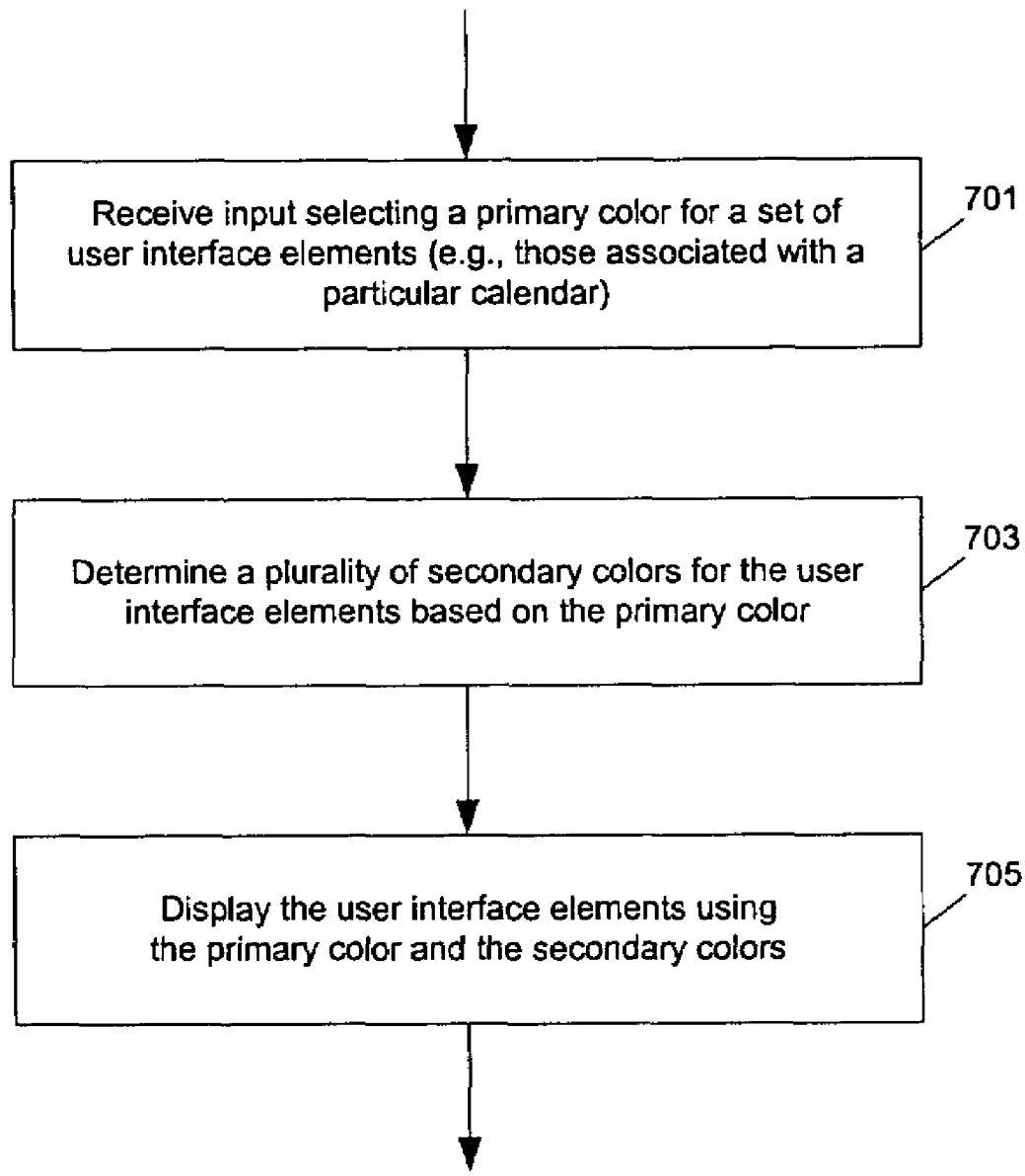
FIGS. 39-41 illustrate flow diagrams of methods to determine secondary colors based on a primary color according to embodiments of the present invention.
Figure 40:
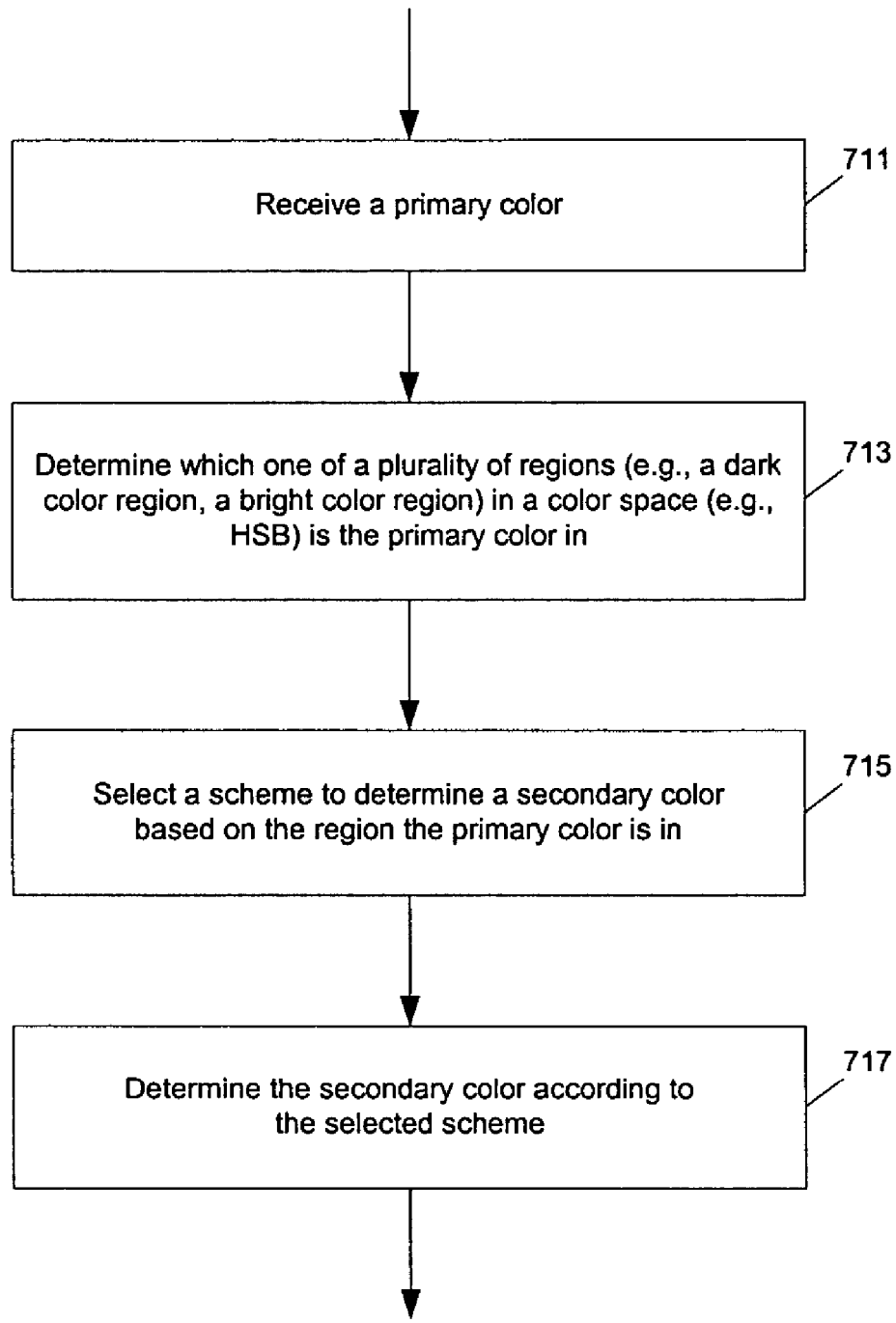
Figure 41:
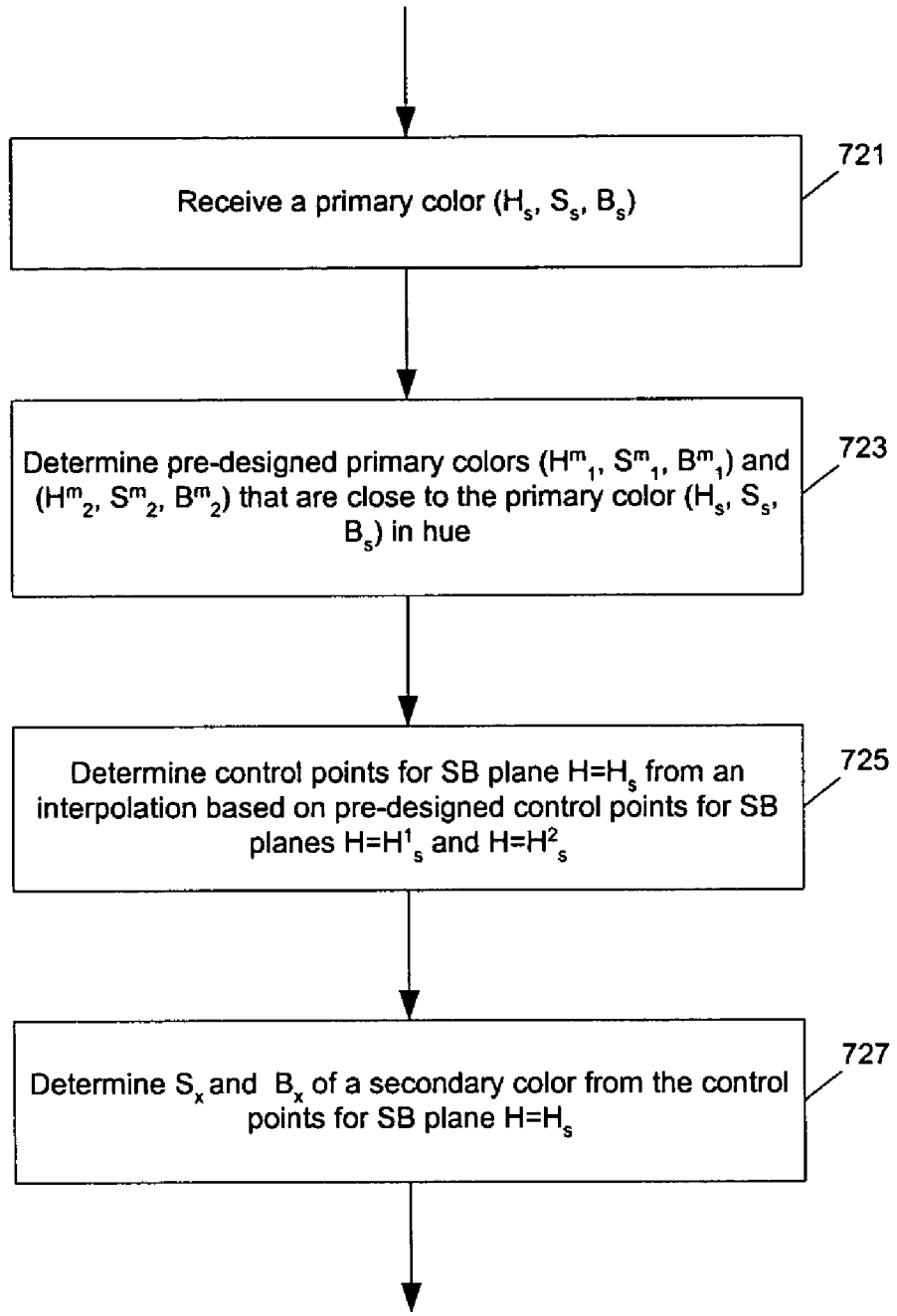

FIGS. 39-41 illustrate flow diagrams of methods to determine secondary colors based on a primary color according to embodiments of the present invention. In FIG. 39, after operation 701 receives input selecting a primary color for a set of user interface elements (e.g., those associated with a particular calendar), operation 703 determines a plurality of secondary colors for the user interface elements based on the primary color. The plurality of secondary colors may be selected from a set of pre-designed colors according to the primary color or computed according to the components of the primary color. Some of the plurality of secondary colors can be discontinuous functions for improved readability when applied to the user interface elements. Alternatively, the plurality of secondary colors can be selectively applied to the user interface elements to avoid readability problems. Operation 705 displays the user interface elements using the primary color and the secondary colors. When the secondary colors are selectively applied to the user interface elements according to the characteristics of the primary color (e.g., whether the primary color is a dark color or a bright color), the color applied to the user interface element is in general a discontinuous function of the primary color.

In FIG. 40, after operation 701 receives a primary color (e.g., from a color chooser as illustrated in FIG. 33, 34 or 35), operation 713 determines which one of a plurality of regions (e.g., a dark color region, a bright color region) in a color space (e.g., HSB) is the primary color in. After operation 715 selects a scheme to determine a secondary color based on the region the primary color is in, operation 717 determines the secondary color according to the selected scheme. For example, if the primary color is a dark color and the required secondary color is a bright color, a scheme to generate a bright color is selected to generate the required secondary color (or a white color is used); however, if the primary color is a bright color and the required secondary color is a bright color, a scheme to generate a dark color can be selected to generate the required secondary color (or a black color is used). Alternatively, a plurality of secondary colors of different characteristics can be generated using continuous interpolation functions of the primary color; and, the plurality of secondary colors are applied to the user interfaces in a way consistent with the region the primary color is in for improved readability. Similarly, the image model for the generation of an icon image can also be selectively determined based on the result of operation 713. Further, icon images generated according to different image models can be mixed according to a parameter that weights the different models based on a measurement of the relative position of the primary color in relation to the regions in the color space to generate the final icon image for the user interface element (e.g., checkbox 333 in FIG. 12).

FIG. 41 illustrates one method to generate a secondary color according to a primary color from interpolation according to one embodiment of the present invention. After operation 721 receives a primary color ($H_S$, $S_S$, $B_S$), operation 723 determines pre-designed primary colors ($H^m_1$, $S^m_1$, $B^m_1$) and ($H^m_2$, $S^m_2$, $B^m_2$) that are close to the primary color ($H_S$, $S_S$, $B_S$) in hue. For example, $H^m_1$ and $H^m_2$ are the closest values among all n pre-designed primary colors ($H^m_i$, $S^m_i$, $B^m_i$) (i=1,2, . . . , n) such that $H^m_1 \leq H_S \leq H^m_2$. Operation 725 then determines control points for SB plane H=$H_s$ from an interpolation based on pre-designed control points for SB planes H=$H^m_1$ and H=$H^m_2$. For example, the positions of control points C 621, $P_C$ 631, $P_B$ 639, $P_W$ 635 and $P_F$ 637 (shown in FIG. 37) can be determined from the linear interpolation from adjacent SB planes, as illustrated in FIG. 36. Operation 727 then determines $S_X$ and $B_X$ of a secondary color from the control points for SB plane $H=H_S$. The hue of the secondary color is the same as the hue of the primary color (e.g., $H_X=H_S$). Thus, the secondary color has the same color tint as the primary color so that a user can easily relate the secondary color to the primary color.

Although the above methods of deriving colors and generating icon images based on an arbitrary selected primary color are described for the display of user interface elements of different calendars, it is understood that these methods can also be used for the color scheme selection for the user interface elements of other types of applications. For example, a desktop environment may involve a number of different colors for different user interface elements (e.g., foreground and background colors for menu bars and menu items, foreground and background colors for text fields, text highlight color, colors of 3D shaped buttons and image icons, color for window title bar, colors for gradient background, window resize control, and others). Based on a set of pre-designed primary colors (e.g., background theme colors) and pre-designed secondary colors that are associated with the primary colors, interpolation schemes can be designed to allow the computation of the secondary colors for the corresponding user interface elements once the user selects an arbitrary primary color (e.g., the background theme color of a desktop environment). Thus, the colors of a set of related user interface elements can be automatically computed from a single user selected color. Further, a computed color may be further adjusted or fine tuned by user (e.g., within a given range) according to the preferences of the user; after such adjustment, the corresponding interpolation function can be adjusted accordingly to reflect the preferences of the user.

Some the examples of color interpolation for the computation of secondary colors based on a user selected primary color are illustrated in HSB space. However, it is understood that the color interpolation can also be performed in other color spaces (e.g., RGB).

The foregoing description has been given by way of example only and it will be appreciated by a person skilled in the art that modifications can be made without departing from the scope of the present invention.

The invention claimed is:

1. A method to display user interface elements on a data processing system, the method comprising:
   automatically determining, based on a primary color, a plurality of secondary colors for the user interface elements, wherein the plurality of secondary colors are assigned different roles in the user interface elements and wherein a first user interface element is assigned a first secondary color from the plurality of secondary colors and wherein a second user interface element is assigned one of the plurality of secondary colors based on a first characteristic of the second user interface element if displayed in a first relation with the first user interface element, wherein the first user interface element is text and the second user interface element is a gradient background and the first characteristic is readability and the first relation is overlapping;
   displaying the user interface elements using the plurality of secondary colors;
   displaying information from a plurality of calendars in a calendar interface, wherein the primary color is associated with one of the plurality of calendars and wherein the user interface elements displayed using the plurality of secondary colors are associated with the one of the plurality of calendars;
   selecting an arbitrary color as the primary color for the one of the plurality of calendars.

2. A method as in claim 1, wherein the primary color and the plurality of secondary colors have substantially same Hue.

3. A method as in claim 1, further comprising:
   displaying a plurality of colors on a display device of the data processing system; and
   receiving user input selecting one of the plurality of colors as the primary color.

4. A method as in claim 3, wherein said determining comprises:
   selecting the plurality of secondary colors from a plurality of pre-designed colors according to the primary color.

5. A method as in claim 1, wherein said determining comprises:
   computing color components of the plurality of secondary colors according to color components of the primary color.

6. A method as in claim 1, wherein said determining comprises:
   computing color components of one of the plurality of secondary colors based on color components of the primary color and color components of a plurality of pre-designed secondary colors that are associated respectively with a plurality of pre-designed primary colors.

7. A method as in claim 6, wherein the color components of the one of the plurality of secondary colors are discontinuous functions of the color components of the primary color.

8. A method as in claim 6, wherein the color components of the one of the plurality of secondary colors are continuous functions of the color components of the primary color; and, the method further comprises:
   selecting one from a plurality of candidates to color a user interface element, the plurality of candidates comprising the one of the plurality of secondary colors.

9. A method as in claim 1, further comprising:
   determining which one of a plurality of regions in a color space is the primary color in.

10. A method as in claim 9, wherein said determining the plurality of secondary colors is performed based on a result of said determining which one of the plurality of regions in the color space is the primary color in.

11. A method as in claim 1, further comprising:
    generating an icon image for the user interface elements using at least one of the plurality of secondary colors.

12. A method as in claim 11, wherein said generating comprises:
    creating a plurality of icon images according to a plurality of image models, each of the plurality of image model being associated with one of a plurality of regions a color space; and
    mixing the plurality of icon images according to a position of the primary color in relation with the plurality of regions in the color space.

13. A method as in claim 12, wherein the plurality of regions comprises a dark color region and a bright color region; and said mixing is according to a measurement of distance to a boundary that separates the dark color region and the bright color region in the color space.

14. A method as in claim 1, wherein said displaying comprises:
    selecting one from candidates including at least one of the plurality of secondary colors to apply to one of the user interface elements.

15. A computer storage medium containing executable computer program instructions which when executed by a data processing system cause said system to perform a method to display user interface elements on the data processing system, the method comprising:

automatically determining, based on a primary color, a plurality of secondary colors for the user interface elements, wherein the plurality of secondary colors are assigned different roles in the user interface elements and wherein a first user interface element is assigned a first secondary color from the plurality of secondary colors and wherein a second user interface element is assigned one of the plurality of secondary colors based on a first characteristic of the second user interface element if displayed in a first relation with the first user interface element, wherein the first user interface element is text and the second user interface element is a gradient background and the first characteristic is readability and the first relation is overlapping;

displaying the user interface elements using the plurality of secondary colors;

displaying information from a plurality of calendars in a calendar interface, wherein the primary color is associated with one of the plurality of calendars and wherein the user interface elements displayed using the plurality of secondary colors are associated with the one of the plurality of calendars;

selecting an arbitrary color as the primary color for the one of the plurality of calendars.

16. The computer storage medium as in claim 15, wherein the primary color and the plurality of secondary colors have substantially same Hue.

17. The computer storage medium as in claim 15, wherein the method further comprises:

displaying a plurality of colors on a display device of the data processing system; and receiving user input selecting one of the plurality of colors as the primary color.

18. The computer storage medium as in claim 17, wherein said determining comprises:

selecting the plurality of secondary colors from a plurality of pre-designed colors according to the primary color.

19. The computer storage medium as in claim 15, wherein said determining comprises:

computing color components of the plurality of secondary colors according to color components of the primary color.

20. The computer storage medium as in claim 15, wherein said determining comprises:

computing color components of one of the plurality of secondary colors based on color components of the primary color and color components of a plurality of pre-designed secondary colors that are associated respectively with a plurality of pre-designed primary colors.

21. The computer storage medium as in claim 20, wherein the color components of the one of the plurality of secondary colors are discontinuous functions of the color components of the primary color.

22. The computer storage medium as in claim 20, wherein the color components of the one of the plurality of secondary colors are continuous functions of the color components of the primary color; and, the method further comprises:

selecting one from a plurality of candidates to color a user interface element, the plurality of candidates comprising the one of the plurality of secondary colors.

23. The computer storage medium as in claim 15, wherein the method further comprises:

determining which one of a plurality of regions in a color space is the primary color in.

24. The computer storage medium as in claim 23, wherein said determining the plurality of secondary colors is performed based on a result of said determining which one of the plurality of regions in the color space is the primary color in.

25. The computer storage medium as in claim 15, wherein the method further comprises:

generating an icon image for the user interface elements using at least one of the plurality of secondary colors.

26. The computer storage medium as in claim 25, wherein said generating comprises:

creating a plurality of icon images according to a plurality of image models, each of the plurality of image model being associated with one of a plurality of regions a color space; and mixing the plurality of icon images according to a position of the primary color in relation with the plurality of regions in the color space.

27. The computer storage medium as in claim 26, wherein the plurality of regions comprises a dark color region and a bright color region;

and said mixing is according to a measurement of distance to a boundary that separates the dark color region and the bright color region in the color space.

28. The computer storage medium as in claim 15, wherein said displaying comprises:

selecting one from candidates including at least one of the plurality of secondary colors to apply to one of the user interface elements.

29. A system to process data and to display user interface elements, the system comprising:

means for automatically determining, based on a primary color, a plurality of secondary colors for the user interface elements, wherein the plurality of secondary colors are assigned different roles in the user interface elements and wherein a first user interface element is assigned a first secondary color from the plurality of secondary colors and wherein a second user interface element is assigned one of the plurality of secondary colors based on a first characteristic of the second user interface element if displayed in a first relation with the first user interface element, wherein the first user interface element is text and the second user interface element is a gradient background and the first characteristic is readability and the first relation is overlapping;

means for displaying the user interface elements using the plurality of secondary colors;

means for displaying information from a plurality of calendars in a calendar interface, wherein the primary color is associated with one of the plurality of calendars and wherein the user interface elements displayed using the plurality of secondary colors are associated with the one of the plurality of calendars;

means for selecting an arbitrary color as the primary color for the one of the plurality of calendars.

30. The system as in claim 29, wherein the primary color and the plurality of secondary colors have substantially same Hue.

31. The system as in claim 29, further comprising:

means for displaying a plurality of colors on a display device of the data processing system; and means for receiving user input selecting one of the plurality of colors as the primary color.

32. The system as in claim 31, wherein said means for determining comprises:

means for selecting the plurality of secondary colors from a plurality of pre-designed colors according to the primary color.

33. The system as in claim 29, wherein said means for determining comprises:
   means for computing color components of the plurality of secondary colors according to color components of the primary color.

34. The system as in claim 29, wherein said means for determining comprises:
   means for computing color components of one of the plurality of secondary colors based on color components of the primary color and color components of a plurality of pre-designed secondary colors that are associated respectively with a plurality of pre-designed primary color.

35. The system as in claim 34, wherein the color components of the one of the plurality of secondary colors are discontinuous functions of the color components of the primary color.

36. The system as in claim 34, wherein the color components of the one of the plurality of secondary colors are continuous functions of the color components of the primary color; and, the data processing system further comprises:
   means for selecting one from a plurality of candidates to color a user interface element, the plurality of candidates comprising the one of the plurality of secondary colors.

37. The system as in claim 29, further comprising:
   means for determining which one of a plurality of regions in a color space is the primary color in.

38. The system as in claim 37, wherein the plurality of secondary colors is determined based on a result of determining which one of the plurality of regions in the color space is the primary color in.

39. The system as in claim 29, further comprising:
   means for generating an icon image for the user interface elements using at least one of the plurality of secondary colors.

40. The system as in claim 39, wherein said means for generating comprises:
   means for creating a plurality of icon images according to a plurality of image models, each of the plurality of image model being associated with one of a plurality of regions a color space; and
   means for mixing the plurality of icon images according to a position of the primary color in relation with the plurality of regions in the color space.

41. The system as in claim 40, wherein the plurality of regions comprises a dark color region and a bright color region; and the plurality of icon images are mixed according to a measurement of distance to a boundary that separates the dark color region and the bright color region in the color space.

42. The system as in claim 29, wherein said means for displaying comprises:
   means for selecting one from candidates including at least one of the plurality of secondary colors to apply to one of the user interface elements.

43. A method of controlling a graphical user interface of a data processing system, the method comprising:
   presenting a range of colors which appear to vary in a substantially continuous manner;
   receiving a user input selecting a color from said range of colors;
   automatically determining, based on said color from said range of colors, a plurality of colors for a corresponding plurality of user interface elements, wherein the plurality of colors are assigned different roles in the user interface elements and wherein a first user interface element in the plurality of user interface elements is assigned a first color from the plurality of colors and wherein a second user interface element in the plurality of user interface elements is assigned one of the plurality of colors based on a first characteristic of the second user interface element if displayed in a first relation with the first user interface element, wherein the first user interface element is text and the second user interface element is a gradient background and the first characteristic is readability and the first relation is overlapping;
   displaying said plurality of user interface elements with said plurality of colors displaying information from a plurality of calendars in a calendar interface, wherein the color from the range of colors is associated with one of the plurality of calendars and wherein the plurality of user interface elements displayed using the plurality of colors is associated with the one of the plurality of calendars;
   selecting an arbitrary color as the color from the range of colors for the one of the plurality of calendars.

44. A method as in claim 43, wherein said automatically determining is based upon a predetermined mathematical process, executed by said data processing system, which selects said plurality of colors without user intervention.

45. A method as in claim 43, wherein said range of colors is presented as a color spectrum in a color wheel.

46. A method as in claim 43, wherein said plurality of user interface elements include at least one of:
   a) window title bar;
   b) text highlight color;
   c) text;
   d) control button;
   e) window resize control; and
   f) scheduled events in a calendar.

47. A method as in claim 43, wherein one of said plurality of user interface elements is displayed in said color from said range of colors.

48. A method as in claim 43, wherein at least one of said plurality of user interface elements is a control, which upon activation by a user, causes said data processing system to perform an action.

49. A computer storage medium, containing executable computer program instructions which when executed by a data processing system cause said system to perform a method of controlling a graphical user interface of said data processing system, the method comprising:
   presenting a range of colors which appear to vary in a substantially continuous manner;
   receiving a user input selecting a color from said range of colors;
   automatically determining, based on said color from said range of colors, a plurality of colors for a corresponding plurality of user interface elements, wherein the plurality of colors are assigned different roles in the user interface elements and wherein a first user interface element in the plurality of user interface elements is assigned a first color from the plurality of colors and wherein a second user interface element in the plurality of user interface elements is assigned one of the plurality of colors based on a first characteristic of the second user interface element if displayed in a first relation with the first user interface element, wherein the first user interface element is text and the second user interface element is a gradient background and the first characteristic is readability and the first relation is overlapping;
   displaying said plurality of user interface elements with said plurality of colors displaying information from a plurality of calendars in a calendar interface, wherein the color from the range of colors is associated with one of the plurality of calendars and wherein the plurality of user interface elements displayed using the plurality of colors is associated with the one of the plurality of calendars;

selecting an arbitrary color as the color from the range of colors for the one of the plurality of calendars.

50. The computer storage medium as in claim 49, wherein said automatically determining is based upon a predetermined mathematical process, executed by said data processing system, which selects said plurality of colors without user intervention.

51. The computer storage medium as in claim 49, wherein said range of colors is presented as a color spectrum in a color wheel.

52. The computer storage medium as in claim 49, wherein said plurality of user interface elements include at least one of:
   a) window title bar;
   b) text highlight color;
   c) text;
   d) control button;
   e) window resize control; and
   f) scheduled events in a calendar.

53. The computer storage medium as in claim 49, wherein one of said plurality of user interface elements is displayed in said color from said range of colors.

54. The computer storage medium as in claim 49, wherein at least one of said plurality of user interface elements is a control, which upon activation by a user, causes said data processing system to perform an action.

55. A system to process data for a graphical user interface, the system comprising:
   means for presenting a range of colors which appear to vary in a substantially continuous manner;
   means for receiving a user input selecting a color from said range of colors;
   means for automatically determining, based on said color from said range of colors, a plurality of colors for a corresponding plurality of user interface elements, wherein the plurality of colors are assigned different roles in the user interface elements and wherein a first user interface element in the plurality of user interface elements is assigned a first color from the plurality of colors and wherein a second user interface element in the plurality of user interface elements is assigned one of the plurality of colors based on a first characteristic of the second user interface element if displayed in a first relation with the first user interface element, wherein the first user interface element is text and the second user interface element is a gradient background and the first characteristic is readability and the first relation is overlapping;
   means for displaying said plurality of user interface elements with said plurality of colors
   means for displaying information from a plurality of calendars in a calendar interface, wherein the color from the range of colors is associated with one of the plurality of calendars and wherein the plurality of user interface elements displayed using the plurality of colors is associated with the one of the plurality of calendars;
   means for selecting an arbitrary color as the color from the range of colors for the one of the plurality of calendars.

56. The system as in claim 55, wherein the plurality of colors are automatically determined based upon a predetermined mathematical process, executed by said data processing system, which selects said plurality of colors without user intervention.

57. The system as in claim 55, wherein said range of colors is presented as a color spectrum in a color wheel.

58. The system as in claim 55, wherein said plurality of user interface elements include at least one of:
   a) window title bar;
   b) text highlight color;
   c) text;
   d) control button;
   e) window resize control; and
   f) scheduled events in a calendar.

59. The system as in claim 55, wherein one of said plurality of user interface elements is displayed in said color from said range of colors.

60. The system as in claim 55, wherein at least one of said plurality of user interface elements is a control, which upon activation by a user, causes said data processing system to perform an action.

* * * * *